(12) United States Patent
Khansari et al.

(10) Patent No.: US 12,333,787 B2
(45) Date of Patent: Jun. 17, 2025

(54) MITIGATING REALITY GAP THROUGH FEATURE-LEVEL DOMAIN ADAPTATION IN TRAINING OF VISION-BASED ROBOT ACTION MODEL

(71) Applicant: GOOGLE LLC, Mountain View, CA (US)

(72) Inventors: Mohi Khansari, San Carlos, CA (US); Daniel Ho, Fremont, CA (US); Eric Jang, Cupertino, CA (US); Yu Qing Du, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 315 days.

(21) Appl. No.: 17/986,428

(22) Filed: Nov. 14, 2022

(65) Prior Publication Data

US 2023/0154160 A1    May 18, 2023

Related U.S. Application Data

(60) Provisional application No. 63/280,039, filed on Nov. 16, 2021.

(51) Int. Cl.
*G06K 9/00* (2022.01)
*G06T 5/50* (2006.01)
*G06V 10/774* (2022.01)

(52) U.S. Cl.
CPC ............ *G06V 10/774* (2022.01); *G06T 5/50* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 11,213,946 B1* | 1/2022 | Bai | G05D 1/0221 |
| 11,461,589 B1* | 10/2022 | Bai | G06N 3/08 |
| 11,494,632 B1* | 11/2022 | Bai | G06N 3/09 |
| 2020/0279134 A1* | 9/2020 | Bousmalis | G06N 3/006 |
| 2021/0107157 A1* | 4/2021 | Bai | B25J 9/1692 |
| 2024/0118667 A1* | 4/2024 | Rao | B25J 19/023 |

OTHER PUBLICATIONS

Amiranashvili, A. et al. "Motion Perception in Reinforcement Learning with Dynamic Objects"; In Conference on Robot Learning (CoRL); 13 pages; dated 2018.

Bonin-Font, F. et al., "Visual Navigation for Mobile Robots: a Survey," Journal of Intelligent and Robotic Systems, vol. 53, No. 3; 26 pages, dated 2008.

Bousmalis, K. et al., "Using Simulation and Domain Adaptation to Improve Efficiency of Deep Robotic Grasping;" 2018 IEEE International Conference on Robotics and Automation (ICRA); 9 pages; dated 2018.

(Continued)

*Primary Examiner* — S J Park
(74) *Attorney, Agent, or Firm* — Gray Ice Higdon

(57) ABSTRACT

Implementations disclosed herein relate to mitigating the reality gap through feature-level domain adaptation in training of a vision-based robotic action machine learning (ML) model. Implementations mitigate the reality gap through utilization of embedding consistency losses and/or action consistency losses during training of the action ML model.

20 Claims, 14 Drawing Sheets

(56) References Cited

OTHER PUBLICATIONS

Bousmalis, K., et al.; Domain Separation Networks; Proc. Neural Information Processing Systems (NIPS); pp. 1-9; dated 2016.
DeSouza, G. et al., "Vision for Mobile Robot Navigation: A survey," IEEE Transactions on Pattern and Machine Intelligence, vol. 24, No. 2, pp. 237-267; dated Feb. 2002.
Ganin, Y., et al.; Domain-Adversarial Training of Neural Networks; Journal of Machine Learning Research; vol. 17, No. 59; pp. 1-35; dated 2016.
Goodfellow, I. et al., "Generative Adversarial Nets;" In Advances in Neural Information Processing Systems; 9 pages; dated 2014.
Gu, S. et al., "Deep Reinforcement Learning for Robotic Manipulation with Asynchronous Off-Policy Updates;" IEEE International Conference on Robotics and Automation (ICRA); pp. 3389-3396; dated 2017.
He, Kaiming, et al.; Deep Residual Learning for Image Recognition, arXiv:1512.03385v1, 12 pages, dated Dec. 10, 2015.
James, S. et al., "Sim-To-Real via Sim-To-Sim: Data-Efficient Robotic Grasping via Randomized-To-Canonical Adaptation Networks;" 2019 IEEE/CVF Conference on Computer Vision and Pattern Recognition (CVPR); 11 pages; dated Jun. 15, 2019.
Khansari, M. et al, "Action Image Representation: Learning Scalable Deep Grasping Policies with Zero Real World Data"; In 2020 IEEE International Conference on Robotics and Automation (ICRA); pp. 3597-3603; dated 2020.
Levine, S. et al. "End-to-End Training of Deep Visuomotor Policies;" Journal of Machine Learning Research, 17; 40 pages; dated Apr. 2016.
Lin, T et al., "Focal Loss For Dense Object Detection;" In International Conference on Computer Vision; 9 pages; dated 2017.
Rahmatizadeh, Rouhollah et al.; Vision-Based Multi-Task Manipulation for Inexpensive Robots Using End-To-End Learning from Demonstration; IEEE International Conference on Robotics and Automation; 8 pages; dated Apr. 2018.
Ross, S. et al., "A Reduction of Imitation Learning and Structured Prediction to No-Regret Online Learning;" in Proceedings of the 14th International Conference on Artificial Intelligence and Statistics (AISTATS); pp. 627-635; dated 2011.
Tobin, J. et al., "Domain Randomization For Transferring Deep Neural Networks From Simulation To The Real World;" 2017 IEEE/RSJ International Conference on Intelligent Robots and Systems (IROS), 8 pages, dated 2017.
Yan, X. et al., "Data-Efficient Learning for Sim-to-Real Robotic Grasping Using Deep Point Cloud Prediction Networks;" Cornell University; arXiv.org; arXiv:1906.08989v1; 10 pages; dated Jun. 21, 2019.
Zhang, R. et al., "Split-Brain Autoencoders: Unsupervised Learning by Cross-Channel Prediction;" In Proceedings of the IEEE Conference on Computer Vision and Pattern Recognition (CVPR); pp. 1058-1067; dated 2017.
Zhang, T. et al., "Deep Imitation Learning for Complex Manipulation Tasks from Virtual Reality Teleoperation;" In IEEE International Conference on Robotics and Automation (ICRA); pp. 5628-5635; dated 2018.
Zhu, J. et al., "Unpaired Image-To-Image Translation Using Cycle-Consistent Adversarial Networks;" 2017 IEEE International Conference on Computer Vision (ICCV), 10 pages, dated 2017.
Zhu, Y. et al., "Target-driven Visual Navigation in Indoor Scenes using Deep Reinforcement Learning;" in IEEE International Conference on Robotics and Automation (ICRA); pp. 3357-3364; dated May 2017.
Chen, T. et al., "A Simple Framework for Contrastive Learning of Visual Representations;" In International Conference on Machine Learning; 11 pages; dated 2020.
Chen, X. et al., "Exploring Simple Siamese Representation Learning;" arXiv.org, Cornell University; arXiv:2011.10566; v1 10 pages; dated Nov. 20, 2020.
Cubuk, E. et al., "AutoAugment: Learning Augmentation Policies from Data;" arXiv.org, Cornell University; preprint arXiv:1805.09501; 14 pages; dated May 24, 2018.
DeVries, T. et al., "Improved Regularization of Convolutional Neural Networks with Cutout;" arXiv.org, Cornell University; preprint arXiv:1708.04552; 8 pages; dated Aug. 15, 2017.
Fang, K. et al., "Multi-Task Domain Adaptation for Deep Learning of Instance Grasping from Simulation;" In 2018 IEEE International Conference on Robotics and Automation (ICRA), 8 pages dated 2018.
Gupta, A. et al., Robot Learning in Homes: Improving Generalization and Reducing Dataset Bias; arXiv.org, Cornell University; arXiv preprint arXiv:1807.07049; 10 pages; dated Jul. 18, 2018.
Ho, D. et al., "Population Based Augmentation: Efficient Learning of Augmentation Policy Schedules;" Proceedings of the 36th International Conference on Machine Learning; 11 pages; dated 2019.
Ho, D. et al., "RetinaGAN: An Object-Aware Approach to Sim-to-Real Transfer;" In 2021 IEEE International Conference on Robotics and Automation (ICRA); 9 pages; dated 2021.
Hodan, T. et al., "BOP Challenge 2020 on 6D Object Localization;" In European Conference on Computer Vision (ECCV); 18 pages; dated 2020.
Huber, Peter J. "Robust Estimation of a Location Parameter;" The Annals of Mathematical Statistics; pp. 73-101; dated 1964.
Henaff, O.J. et al., "Data-Efficient Image Recognition with Contrastive Predictive Coding;" In Proceedings of 37th International Conference on Machine Learning; 11 pages; dated 2020.
Jain, A. et al., "Behavior-Based Door Opening with Equilibrium Point Control;" RSS 2009 Workshop: Mobile Manipulation in Human Environments; 8 pages; dated 2009.
Jang, E. et al., "BC-Z: Zero-Shot Task Generalization with Robotic Imitation Learning;" In 5th Annual Conference on Robot Learning (CoRL); 12 pages; dated 2021.
Li, C. et al., HRL4IN: Hierarchical Reinforcement Learning for Interactive Navigation with Mobile Manipulators; In Proceedings of 3rd International Conference on Robot Learning (CoRL); 14 pages; dated 2019.
Mundhenk, T.N. et al., "Improvements to Context Based Self-Supervised Learning;" In Proceedings of the IEEE Conference on Computer Vision and Pattern Recognition; pp. 9339-9348; dated 2018.
Noroozi, M. et al., "Unsupervised Learning of Visual Representations by Solving Jigsaw Puzzles;" In European Conference on Computer Vision; Springer; pp. 69-84; dated 2016.
Pathak, D. et al., "Context Encoders: Feature Learning by Inpainting;" In Proceedings of the IEEE Conference on Computer Vision and Pattern Recognition (CVPR); pp. 2536-2544; dated 2016.
Peterson, L. et al., "High-Level Control of a Mobile Manipulator for Door Opening;" In Proceedings. 2000 IEEE/RSJ International Conference on Intelligent Robots and Systems; pp. 2333-2338; dated 2000.
Petrovskaya, A. et al., "Probabilistic Mobile Manipulation in Dynamic Environments, with Application to Opening Doors;" In IJCAI-07; pp. 2178-2184; dated 2007.
Rao, K. et al., "RL-CycleGAN: Reinforcement Learning Aware Simulation-To-Real;" In Proceedings of the IEEE/CVF Conference on Computer Vision and Pattern Recognition; pp. 11157-11166; dated 2020.
Sadeghi, F. et al., "CAD2RL: Real Single-Image Flight Without a Single Real Image;" In Robotics: Science and Systems (RSS); 10 pages; dated 2017.
Schmid, A.J. et al., "Opening a Door with a Humanoid Robot Using Multi-Sensory Tactile Feedback;" In 2008 IEEE International Conference on Robotics and Automation (ICRA); pp. 285-291; dated May 2008.
Stuede, M. et al., "Door Opening and Traversal with An Industrial Cartesian Impedance Controlled Mobile Robot;" In 2019 IEEE International Conference on Robotics and Automation (ICRA); pp. 966-972; dated May 2019.
Sun, C. et al., "Fully Autonomous Real-World Reinforcement Learning for Mobile Manipulation;" 5th Conference on Robot Learning (CoRL); 12 pages; dated 2021.

(56) References Cited

OTHER PUBLICATIONS

Tankovich, V. et al., "HITNet: Hierarchical Iterative Tile Refinement Network for Real-Time Stereo Matching;" In Proceedings of the IEEE/CVF Conference on Computer Vision and Pattern Recognition; pp. 14362-14372; dated 2021.

Wang, C. et al. "Learning Mobile Manipulation Through Deep Reinforcement Learning;" Sensors, vol. 20, Issue 3; 18 pages; dated 2020.

Welschehold, T. et al., "Learning Mobile Manipulation Actions from Human Demonstrations;" In 2017 IEEE/RSJ International Conference on Intelligent Robots and Systems (IROS), pp. 3196-3201; dated Sep. 2017.

Wenzel, P. et al. "Modular Vehicle Control for Transferring Semantic Information Between Weather Conditions Using GANS;" In Conference on Robot Learning (CoRl); 17 pages; dated 2018.

Xia, F. et al., "ReLMoGen: Leveraging Motion Generation in Reinforcement Learning for Mobile Manipulation;" arXiv.org, Cornell University; arXiv:2008.07792; 16 pages; dated Mar. 16, 2021.

Yan, X. et al., "Learning 6-DOF Grasping Interaction via Deep Geometry-aware 3D Representations;" In 2018 IEEE International Conference on Robotics and Automation (ICRA); 8 pages; dated 2018.

Zhou, B. et al., "Does Computer Vision Matter for Action?" In Science Robotics: vol. 4, Issue 30; 12 pages; dated 2019.

\* cited by examiner

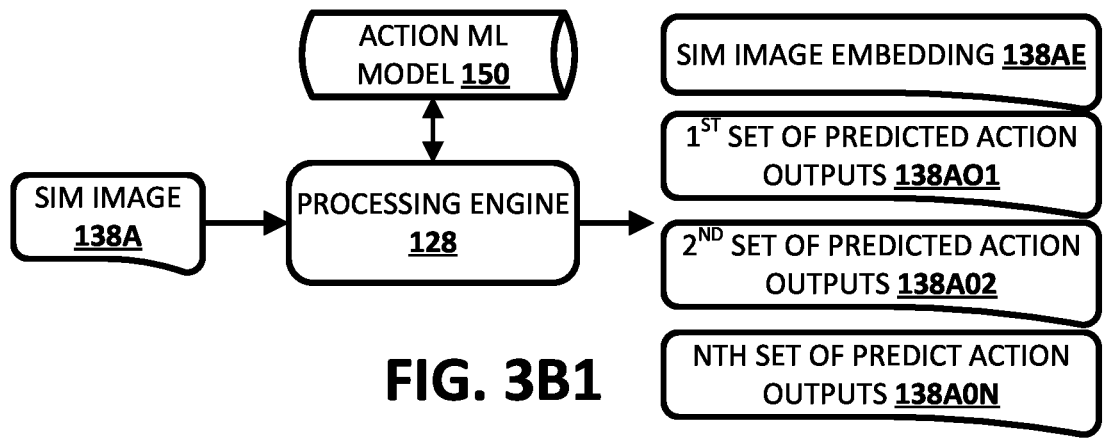
FIG. 3B1
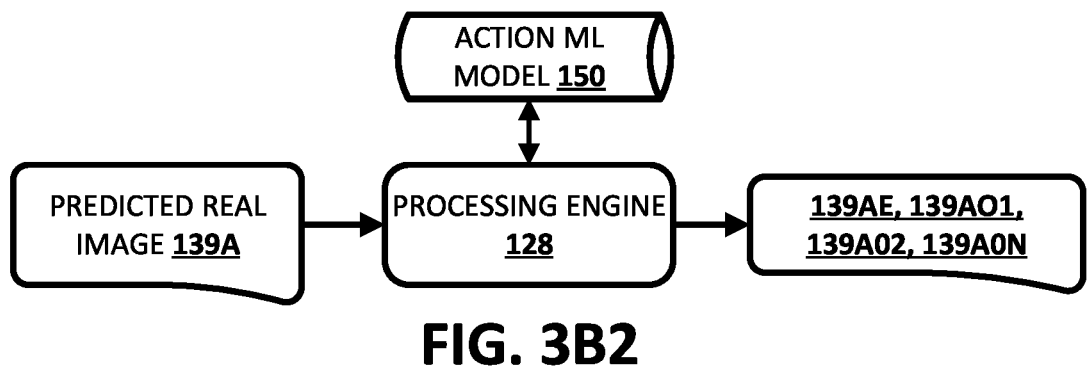
FIG. 3B2
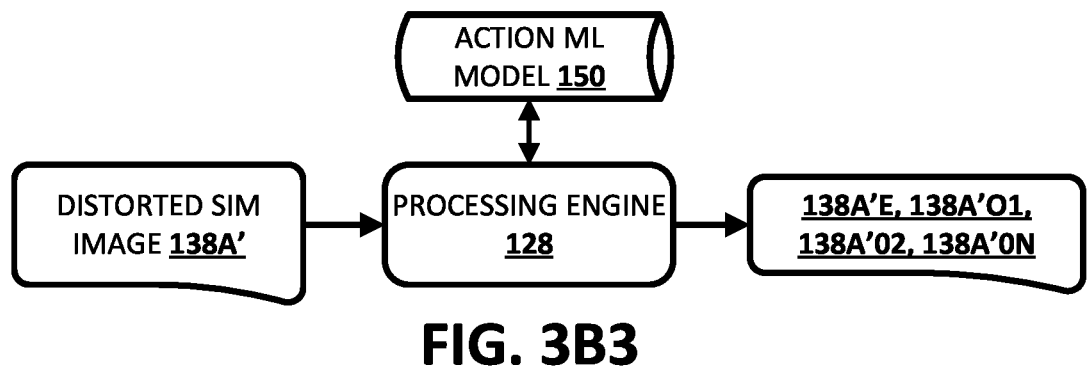
FIG. 3B3
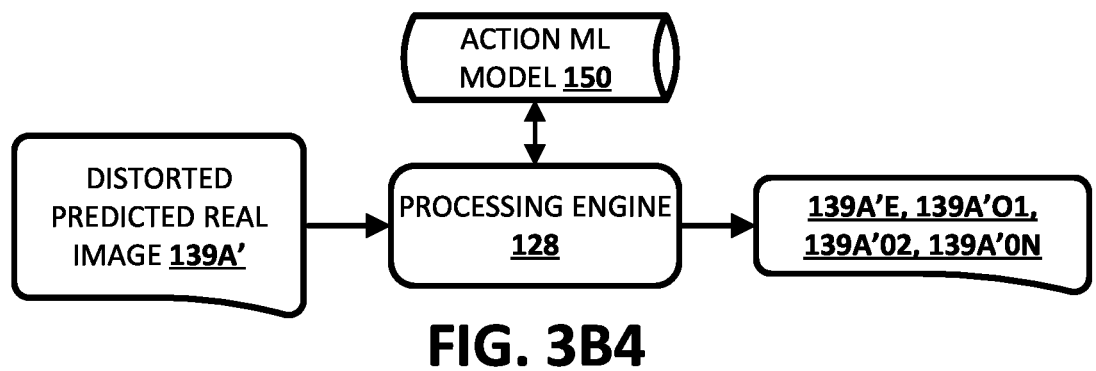
FIG. 3B4

MITIGATING REALITY GAP THROUGH FEATURE-LEVEL DOMAIN ADAPTATION IN TRAINING OF VISION-BASED ROBOT ACTION MODEL

BACKGROUND

Various machine learning based approaches to robotic control have been proposed. For example, a machine learning model (e.g., a deep neural network model) can be trained that can be utilized to process images from vision component(s) of a robot and to generate, based on the processing, predicted output(s) that indicate robotic action(s) to implement in performing a robotic task. Some of those approaches train the machine learning model using training data that is based only on data from real-world physical robots. However, these and/or other approaches can have one or more drawbacks. For example, generating training data based on data from real-world physical robots requires heavy usage of one or more physical robots in generating data for the training data. This can be time-consuming (e.g., actually operating the real-world physical robots requires a large quantity of time), can consume a large amount of resources (e.g., power required to operate the robots), can cause wear and tear to the robots being utilized, can cause safety concerns, and/or can require a great deal of human intervention.

In view of these and/or other considerations, use of robotic simulators has been proposed to generate simulated data that can be utilized in generating simulated data that can be utilized in training and/or validating of the machine learning models. Such simulated data can be utilized as a supplement to, or in lieu of, real-world data.

However, there is often a meaningful "reality gap" that exists between real robots and simulated robots (e.g., physical reality gap) and/or between real environments and simulated environments simulated by a robotic simulator (e.g., visual reality gap). This can result in generation of simulated data that does not accurately reflect what would occur in a real environment. This can affect performance of machine learning models trained on such simulated data and/or can require a significant amount of real-world data to also be utilized in training to help mitigate the reality gap. Additionally or alternatively, this can result in generation of simulated validation data that indicates a trained machine learning model is robust and/or accurate enough for real-world deployment, despite this not being the case in actuality.

Various techniques have been proposed to address the visual reality gap. Some of those techniques randomize parameters of a simulated environment (e.g., textures, lighting, cropping, and camera position), and generate simulated images based on those randomized parameters. Such techniques are referenced as "domain randomization", and theorize that a model trained based on training instances that include such randomized simulated images will be better adapted to a real-world environment (e.g., since the real-world environment may be within a range of these randomized parameters). However, this randomization of parameters requires a user to manually define which parameters of the simulated environment are to be randomized.

Some other techniques are referenced as "domain adaptation", where the goal is to learn features and predictions that are invariant to whether the inputs are from simulation or the real world. Such domain adaptation techniques include utilizing a Generative Adversarial Network ("GAN") model and/or a Cycle Generative Adversarial Network ("CycleGAN") model to perform pixel-level image-to-image translations between simulated environments and real-world environments. For example, a simulation-to-real model from a GAN can be used to transform simulated images, from simulated data, to predicted real images that more closely reflect a real-world, and training and/or validation performed based on the predicted real images. Although both GAN models and CycleGAN models produce more realistic adaptations for real-world environments, they are pixel-level only (i.e., they only adapt the pixels of images provided to the machine learning model) and can still lead to a meaningful reality gap.

SUMMARY

Implementations disclosed herein relate to mitigating the reality gap through feature-level domain adaptation in training of a vision-based robotic action machine learning (ML) model. Those implementations utilize embedding consistency losses and/or action consistency losses, during training of the action ML model. Utilization of such losses trains the action ML model so that features generated by the trained action ML model in processing a simulated image will be similar to (or even the same as in some situations) features generated by the action ML model in processing a predicted real image counterpart. Further, features generated by the trained action ML model in processing a real image will be similar to (or even the same as in some situations) features generated by the action ML model in processing a predicted simulated image counterpart. Yet further, features generated by the trained action ML model in processing an image will be similar to (or even the same as in some situations) features generated by the action ML model in processing a distorted counterpart of the image.

Put another way, instead of utilizing only pixel-level domain adaptation where simulated images are translated into predicted real counterparts before being used for training, implementations disclosed herein seek to achieve feature-level domain adaptation where the action ML model is trained so that simulation and real counterpart images and/or original and distorted counterpart images result in generation of similar features when processed using the action ML model. Such feature-level domain adaptation mitigates the reality gap, enabling utilization of simulated data in training and/or validating the model, while ensuring accuracy and/or robustness of the trained action ML model when deployed on a real-world robot. For example, such feature-level domain adaptation enables the action ML model to be trained at least in part on simulated data, while ensuring the trained action ML model is robust and/or accurate when deployed on a real-world robot. As another example, such feature-level domain adaptation additionally or alternatively enables the action ML model to be validated based on simulated data, while ensuring the validation accurately reflects whether the trained action ML model is robust and/or accurate enough for real-world use.

The embedding consistency losses and/or the action consistency losses can be auxiliary losses that are utilized, along with primary losses for the robotic task, in updating the action ML model during training. The primary losses can be supervision losses generated based on a supervision signal. For example, imitation learning can be utilized where the supervision signals are ground truth actions from a human demonstration of the robotic task. For instance, the demonstration can be via virtual reality or augmented reality based control of a real or simulated robot, or via physical kinesthetic control of a real robot. As another example, reinforcement learning can additionally or alternatively be utilized where the supervision signals are sparse rewards generated according to a reward function.

Generally, the embedding consistency losses seek to penalize discrepancies between paired embeddings that are generated by vision feature layers of the action ML model. A paired embedding includes a first embedding generated by processing a first image using the vision layers and a second embedding generated by processing a second image using the vision feature layers. The embeddings are paired responsive to the first and second images being paired. The first and second images are paired based on being counterparts of one another that are generated in a certain manner. For example, a simulated image can be paired with a predicted real image responsive to it being generated based on processing the simulated image using a simulation-to-real generator model. As another example, the simulated image can be paired with a distorted version of the predicted real image, the simulated image paired with a distorted version of the simulated image, and/or a distorted version of a simulated image paired with a distorted version of the predicted real image. As yet another example, a real image can be paired with a predicted simulated image responsive to it being generated based on processing the real image using a real-to-simulation generator model. As further examples, the real image can be paired with a distorted version of the predicted simulated image, the real image paired with a distorted version of the real image, and/or a distorted version of a real image paired with a distorted version of the predicted simulated image.

Through utilization of the embedding consistency losses that penalize discrepancies between paired embeddings for paired images, the vision feature layers of the action ML model are trained to generate similar embeddings for paired images. Accordingly, through training, the vision feature layers can generate similar embeddings for a real image and a predicted simulated image generated based on the real image, despite the two images varying pixel-wise. Likewise, the vision feature layers can generate similar embeddings for a simulated image and a predicted real image generated based on the simulated image, despite the two images varying pixel-wise. Moreover, the vision feature layers can generate similar embeddings for a first image and a distorted version of the first image, despite the two images varying pixel-wise. The distorted version can be a cropped version of the first image, can include cutout(s) that are absent from the first image, can have Gaussian noise that is absent from the first image, and/or can have different brightness, saturation, hue, and/or contrast than the first image. The embedding consistency loss can be applied as an auxiliary loss to the vision feature layers or, alternatively, applied as an auxiliary loss to all or part of the additional layers (and a residual thereof applied to the vision feature layers).

Generally, the action consistency losses seek to penalize discrepancies between paired predicted action outputs that are generated by additional layers of the action ML model. Paired predicted action outputs include first action output(s) generated by processing a first image using the action ML model and second action output(s) generated by processing a second image using the action ML model. The action outputs are paired responsive to the first and second images being paired, e.g., as described above. Through utilization of the action consistency losses that penalize discrepancies between paired action outputs for paired images, the additional layers (and the vision feature layers) of the action ML model are trained to generate similar action outputs for paired images. Accordingly, through training, the action ML model can generate similar action outputs for a real image and a predicted simulated image generated based on the real image, despite the two images varying pixel-wise and despite their embeddings varying (but potentially being similar as described above). Likewise, the action ML model can generate similar action outputs for a simulated image and a predicted real image generated based on the simulated image, despite the two images varying pixel-wise and despite their embeddings varying (but potentially being similar as described above). Moreover, the action ML model can generate similar action outputs for a first image and a distorted version of the first image, despite the two images varying pixel-wise and despite their embeddings varying (but potentially being similar as described above). The action consistency losses can be applied as an auxiliary loss to corresponding portions of the additional layers (and residuals thereof applied to the vision feature layers) or, alternatively, applied as an auxiliary loss to all of the additional layers (and a residual thereof applied to the vision feature layers).

As a working example for providing additional description of some implementations described herein, assume the action ML model is a policy model that generates, at each iteration, predicted action output(s) based on processing a corresponding instance of vision data that captures an environment of a robot during performance of a robotic task. Continuing with the working example, an image can be processed using vision feature layers of the ML model to generate an image embedding, and the image embedding processed using additional layers of the ML model to generate the predicted action output(s). In some implementations, the action ML model can additionally or alternatively process non-image state data (e.g., environmental state data and/or robot state data) in generating the predicted action output(s). Continuing with the working example, a first predicted action output can be generated by processing the image embedding using a first control head that includes a subset of the additional layers, and the first predicted action output can reflect action(s) for an arm of the robot. Continuing with the working example, a second predicted action output can be generated by processing the image embedding using a second control head that includes another subset of the additional layers, and the second predicted action output can reflect action(s) for a base of the robot. Continuing with the working example, a third predicted action output can be generated by processing the image embedding using a third control head that includes another subset of the additional layers, and the third predicted action output can reflect whether the episode of performing the robotic task should be terminated.

Continuing with the working example, assume a human guided demonstration of a robotic task was performed in simulation (e.g., the human utilized controller(s) in controlling a simulated robot to perform the robotic task). A simulated image, that is from the perspective of a simulated vision component of the simulated robot at a given time of the demonstration, can be obtained, along with ground truth action outputs for the given time. For example, the ground truth action outputs for the given time can be based on a next robotic action implemented as a result of the human guided demonstration. A predicted real image can be generated based on processing the simulated image using a simulated-to-real generator model. The predicted real image can be paired with the simulated image, based on the predicted real image being generated based on processing the simulated image using the simulated-to-real generator model.

The simulated image can be processed, using the vision feature layers of the action model, to generate a simulated embedding. Further, the simulated embedding can be processed, using the additional layers, to generate simulated first control head action output, simulated second control head action output, and simulated third control head action output.

Likewise, the predicted real image can be processed, using the vision feature layers of the action model, to generate a predicted real embedding. Further, the predicted real embedding can be processed, using the additional layers, to generate predicted real first control head action output, predicted real second control head action output, and predicted real third control head action output.

An embedding consistency loss can be generated based on comparing the simulated embedding and the predicted real embedding. For example, the embedding consistency loss can be a Huber loss.

Action consistency loss(es) can be generated based on comparing the simulated control head action outputs to the predicted real control head action outputs. For example, a first action consistency loss can be generated based on comparing the simulated first control head action output to the predicted real first control head action output, a second action consistency loss can be generated based on comparing the simulated second control head action output to the predicted real second control head action output, and a third action consistency loss can be generated based on comparing the simulated third control head action output to the predicted real third control head action output. The action consistency losses can be, for example, Huber losses.

Simulated supervised loss(es) can also be generated based on comparing the simulated control head action outputs to the ground truth action outputs. For example, a first simulated supervised loss can be generated based on comparing the simulated first control head action output to a corresponding subset of the ground truth action outputs, a second simulated supervised loss can be generated based on comparing the simulated second control head action output to a corresponding subset of the ground truth action outputs, and a third simulated supervised loss can be generated based on comparing the simulated third control head action output to a corresponding subset of the ground truth action outputs.

Predicted real supervised loss(es) can also be generated based on comparing the predicted real control head action outputs to the ground truth action outputs. For example, a first predicted real supervised loss can be generated based on comparing the predicted real first control head action output to a corresponding subset of the ground truth action outputs, a second predicted real supervised loss can be generated based on comparing the predicted real second control head action output to a corresponding subset of the ground truth action outputs, and a third predicted real supervised loss can be generated based on comparing the simulated third control head action output to a corresponding subset of the ground truth action outputs.

The action ML model can be updated based on the simulated and predicted real supervised losses, as well as the auxiliary embedding consistency loss and/or the action consistency loss(es). As one example, an overall loss can be generated that is based on (e.g., a sum of) the simulated and predicted real supervised losses, the auxiliary embedding consistency loss, and the action consistency loss(es)—and the overall loss applied to the entirety of the action ML model (e.g., the overall loss applied to each of the control heads). As another example, a first loss can be generated that is based on (e.g., a sum of) the first predicted real supervised loss, the first simulated supervised loss, the first action consistency loss and, optionally, the embedding consistency loss—and the first loss applied to the first control head. Likewise, a second loss can be generated that is based on (e.g., a sum of) the second predicted real supervised loss, the second simulated supervised loss, the second action consistency loss and, optionally, the embedding consistency loss—and the second loss applied to the second control head. Likewise, a third loss can be generated that is based on (e.g., a sum of) the third predicted real supervised loss, the third simulated supervised loss, the third action consistency loss and, optionally, the embedding consistency loss—and the third loss applied to the third control head. Optionally, the embedding consistency loss can be applied to only the vision feature layers of the action ML model.

The above description is provided as an overview of only some implementations disclosed herein. These and other implementations are described in more detail herein, including in the detailed description, the claims, the figures, and the appended paper.

Other implementations can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described above and/or elsewhere herein. Yet other implementations can include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3B1 illustrates an example of processing a simulated image using an action ML model, and a simulated image embedding and simulated image predicted action outputs that can be generated based on the processing.

FIG. 3B2 illustrates an example of processing a predicted real image using an action ML model, and a predicted real image embedding and predicted real image predicted action outputs that can be generated based on the processing.

FIG. 3B3 illustrates an example of processing a distorted simulated image using an action ML model, and a distorted simulated image embedding and distorted simulated image predicted action outputs that can be generated based on the processing.

FIG. 3B4 illustrates an example of processing a distorted predicted real image using an action ML model, and a distorted predicted real image embedding and distorted predicted real image predicted action outputs that can be generated based on the processing.

DETAILED DESCRIPTION

Figure 1:
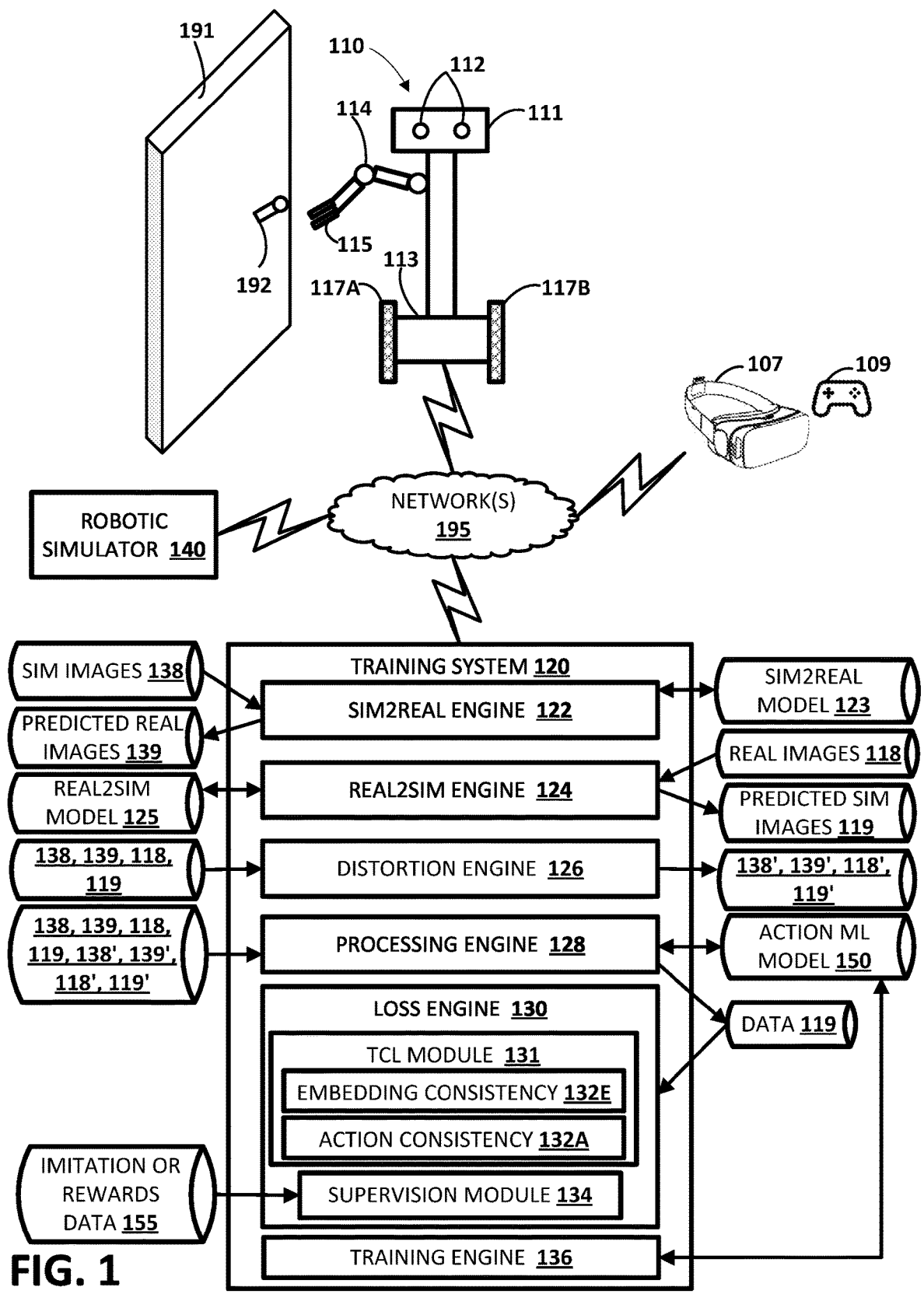
FIG. 1 illustrates an example environment in which implementations disclosed herein can be implemented.

FIG. 1 illustrates an example environment in which implementations disclosed herein can be implemented. The example environment includes a robot 110, a computing device 107, a robotic simulator 140, and a training system 120. One or more of these components of FIG. 1 can be communicatively coupled over one or more networks 195, such as local area networks (LANs), wide area networks (WANs), and/or any other communication network.

In implementations that train action ML model 150 utilizing demonstration data and imitation learning, the computing device 107, which takes the form of a VR and/or AR headset, can be utilized to render various graphical user interfaces for facilitating provision of demonstration data by a human user. Further, the computing device 107 may utilize controller 109 (or other controller(s)) as an input device, or simply track eye and/or hand movements of a user of the computing device 107 via various sensors of the computing device 120 to control the robot 110 and/or to control a simulated robot of the robotic simulator 130. Additional and/or alternative computing device(s) can be utilized to provide demonstration data, such as desktop or laptop devices that can include a display and various input devices, such as a keyboard and mouse. Although particular components are depicted in FIG. 1 it should be understood that is for the sake of example and is not meant to be limiting.

The robot 110 illustrated in FIG. 1 is a particular real-world mobile robot. However, additional and/or alternative robots can be utilized with techniques disclosed herein, such as additional robots that vary in one or more respects from robot 110 illustrated in FIG. 1. For example, a stationary robot arm, a mobile telepresence robot, a mobile forklift robot, an unmanned aerial vehicle ("UAV"), and/or a humanoid robot can be utilized instead of or in addition to robot 110, in techniques described herein. Further, the robot 110 may include one or more engines implemented by processor(s) of the robot and/or by one or more processor(s) that are remote from, but in communication with, the robot 110.

The robot 110 includes one or more visions components 112 that can generate images that capture shape, color, depth, and/or other features of object(s) that are in the line of sight of the vision component 111. The images generated by one or more of the vision components 112 can include, for example, one or more color channels (e.g., a red channel, a green channel, and a blue channel) and/or one or more additional channels (e.g., a depth channel). For example, the vision component(s) 112 can include an RGB-D camera (e.g., a stereographic camera) that can generate RGB-D images. As another example, the vision component(s) 112 can include an RGB camera that generates RGB images and a separate depth camera that generates depth images. The RGB camera and the depth camera can optionally have the same or similar fields of view and orientations. The robot 110 can also include position sensor(s), torque sensor(s), and/or other sensor(s) that can generate data and such data, or data derived therefrom, can form some or all of state data (if any).

The robot 110 also includes a base 113 with wheels 117A, 117B provided on opposed sides thereof for locomotion of the robot 110. The base 113 can include, for example, one or more motors for driving the wheels 117A, 117B of the robot 110 to achieve a desired direction, velocity, and/or acceleration of movement for the robot 110.

The robot 110 also includes one or more processors that, for example: provide control commands to actuators and/or other operational components thereof. The control commands provided to actuator(s) and/or other operational component(s) can, during demonstrations, be based on input(s) from a human and can form part of the action data (if any) that is included in ground truth demonstration data. Further, action output(s) that are generated based on a trained action ML model 150 deployed on the robot 110 can be used in generating the control commands to provide to actuator(s) and/or other operational component(s).

The robot 110 also includes robot arm 114 with end effector 115 that takes the form of a gripper with two opposing "fingers" or "digits." Additional and/or alternative end effectors can be utilized, or even no end effector. For example, alternative grasping end effectors can be utilized that utilize alternate finger/digit arrangements, that utilize suction cup(s) (e.g., in lieu of fingers/digits), that utilize magnet(s) (e.g., in lieu of fingers/digits), etc. Also, for example, a non-grasping end effector can be utilized such as an end effector that includes a drill, an impacting tool, etc.

In some implementations, a human can utilize computing device 107 (or input devices thereof) and/or other computing device to control the robot 110 to perform a human-guided demonstration of a robotic task. For example, the user can utilize the controller 109 associated with the computing device 107 and demonstration data can be generated based on instances of vision data captured by one or more of the vision components 112 during the demonstration, and based on ground truth action output values generated during the demonstration. In additional or alternative implementations, the user can perform the demonstration by physically manipulating the robot 110 or one or more components thereof (e.g., the base 113, the robot arm 114, the end effector 115, and/or other components). For example, the user can physically manipulate the robot arm 114, and the demonstration data can be generated based on the instances of the vision data captured by one or more of the vision components 112 and based on the physical manipulation of the robot 110. The user can repeat this process to generate demonstration data for performance of various robotic tasks.

One non-limiting example of a robotic task that can be demonstrated is a door opening task. For example, the user can control (e.g., via computing device 107) the base 113 and the arm 114 of the robot 110 to cause the robot 110 to navigate toward the door 191, to cause the end effector 115 to contact and rotate the handle 192 of the door 191, to move the base 113 and/or the arm 114 to push (or pull) the door 191 open, and to move the base 113 to cause the robot 110 to navigate through the door 191 while the door 191 remains open. Demonstration data from the demonstration can include images captured by vision component(s) 112 during the demonstration and action outputs that correspond to each of the images. The action outputs can be based on control commands that are issued responsive to the human guidance. For example, images and action outputs can be sampled at 10 Hz or other frequency and stored as the demonstration data from a demonstration of a robotic task.

In some implementations, the human demonstrations can be performed in a real-world environment using the robot 110 (e.g., as described above). In additional or alternative implementations, the human demonstrations can be performed in a simulated environment using a simulated instance of the robot 110 via the robotic simulator 140. For example, in implementations where the human demonstrations are performed in the simulated environment using a simulated instance of the robot 110, a simulated configuration engine can access object model(s) database to generate a simulated environment with a door and/or with other environmental objects. Further, the user can control the simulated instance of the robot 110 to perform a simulated robotic task by causing the simulated instance of the robot 110 to perform a sequence of simulated actions.

In some implementations, the robotic simulator 140 can be implemented by one or more computer systems, and can be utilized to simulate various environments that include corresponding environmental objects, to simulate an instance the robot 110 operating in the simulated environment depicted in FIG. 1 and/or other environments, to simulate responses of the robot in response to virtual implementation of various simulated robotic actions in furtherance of various robotic tasks, and to simulate interactions between the robot and the environmental objects in response to the simulated robotic actions. Various simulators can be utilized, such as physics engines that simulate collision detection, soft and rigid body dynamics, etc. Accordingly, the human demonstrations and/or performance of various robotic tasks described herein can include those that are performed by the robot 110, that are performed by another real-world robot, and/or that are performed by a simulated instance of the robot 110 and/or other robots via the robotic simulator 140.

All or aspects of training system 120 can be implemented by the robot 110 in some implementations. In some implementations, all or aspects of training system 120 can be implemented by one or more remote computing systems and/or devices that are remote from the robot 110. Various modules or engines may be implemented as part of training system 120 as software, hardware, or any combination of the two. For example, as shown in FIG. 1, training system 120 can include a simulation-to-real ("Sim2Real") engine 122, a real-to-simulation ("Real2Sim") engine 124, a distortion engine 126, a processing engine 128, a loss engine 130, and a training engine 136.

The Sim2Real engine 122 processes simulated images 138, utilizing a Sim2Real model 123, to generate predicted real images 139. For example, a given simulated image, of simulated images 138, can be processed by the Sim2Real engine 122, using the Sim2Real model 123, to generate a given predicted real image of the predicted real images 139. The simulated images 138 can be those generated by the robotic simulator 140 during simulated episodes of a simulated robot performing a robotic task in a simulated environment of the robotic simulator. The simulated images 138 can be from the perspective of a simulated vision component of the robot, such as a vision component on the head or the body of the simulated robot. Accordingly, the simulated images 138 can be "first person" in that they are from the perspective of the robot. An episode of the simulated robot performing the robotic task can be, for example, a human guided demonstration episode or a reinforcement learning episode (e.g., where the simulated robot is controlled based on a currently trained version of the action ML model 150).

The Real2Sim engine 124 processes real images 118, utilizing a Real2Sim model 125, to generate predicted simulated images 119. For example, a given real image, of real images 118, can be processed by the Real2Sim engine 124, using the Real2Sim model 125, to generate a given predicted simulated image of the predicted simulated images 119. The real images 118 can be those generated by the robot 100 (e.g., by vision component(s) 112) and/or other robot(s) during episodes of a real robot performing a robotic task in a real environment of the robot 100. The episode of the real robot performing the robotic task can be, for example, a human guided demonstration episode or a reinforcement learning episode (e.g., where the real robot is controlled based on a currently trained version of the action ML model 150).

The distortion engine 126 processes the simulated images 138, the real images 118, the predicted simulated images 119, and/or the predicted real images 139 to generate corresponding distorted image(s) for each of the processed images. The distorted images can include distorted simulated images 138', distorted real images 119', distorted predicted simulated images 119', and/or distorted predicted real images 139'.

In generating a distorted image, that is a distorted version of a base image, the distortion engine 126 can apply one or more distortion techniques to the base image such as cropping, adding cutout(s), adding Gaussian noise, and/or adapting brightness, saturation, hue, and/or contrast than the first image. As one example, the distortion engine 126 can process a given simulated image to generate multiple distorted images that are each a corresponding distortion of the given simulated image. For example, the distortion engine 126 can generate a first distorted image based on applying a first set of distortion techniques to the given simulated image and generate a second distorted image based on applying a second set of distortion techniques. As another example, the distortion engine 126 can generate a first distorted image based on applying a first set of distortion techniques with first random values (e.g., first Gaussian noise) to the given simulated image and generate a second distorted image based on applying the same first set of distortion techniques, but with second random values (e.g., second Gaussian noise).

The processing engine 128 processes each of the images 138, 139, 118, 119, 138', 139', 118', 119', individually and using the action ML model 150, to generate a corresponding instance of data, and stores that data in database 119. For example, and as described herein, in processing a given image using the action ML model 150, an image embedding of the given image can be generated based on processing the image using vision feature layers of the action ML model 150, and action output(s) can be generated based on processing the image embedding using additional layers of the action ML model 150. The instance of data, for the given image, can include the generated image embedding and the generated action output(s).

The loss engine 130 utilizes the instances of data, in database 119, in generating losses for training the action ML model 150. The training engine 136 utilizes the generated losses in updating the action ML model 150 (e.g., by backpropagating the losses over the layers of the action ML model 150).

The loss engine 130 can include a task consistency loss module 131 and a supervision module 134. The tack consistency loss module 131 can include an embedding consistency component 132E that generates embedding consistency losses and/or an action consistency component 132A that generates action consistency losses.

In generating embedding consistency losses, the embedding consistency component 132E generates the losses based on paired embeddings from the data 119. As described herein, paired embeddings can be paired based on their corresponding images being paired. Likewise, in generating action consistency losses, the action consistency component 132A generates the losses based on paired action outputs from the data 119. As described herein, paired action outputs can be paired based on their corresponding images being paired.

The supervision module 134 generates supervised losses. In generating a supervised loss for a data instance, the supervision module 134 can compare action output(s) from a data instance to supervised data, such as supervised data from imitation or rewards data 155. For example, the imitation or rewards data 155 can include ground truth imitation data, for the data instance, that is based on a corresponding human-guided demonstration episode. As another example, the imitation or rewards data 155 can include a sparse or intermediate reward, for the data instance, that is based on a reward function and data from a corresponding reinforcement learning episode.

Turning now to the remainder of the Figures, additional description is provided of various components of FIG. 1, as well as methods that can be implemented by various components of FIG. 1.

Figure 2:
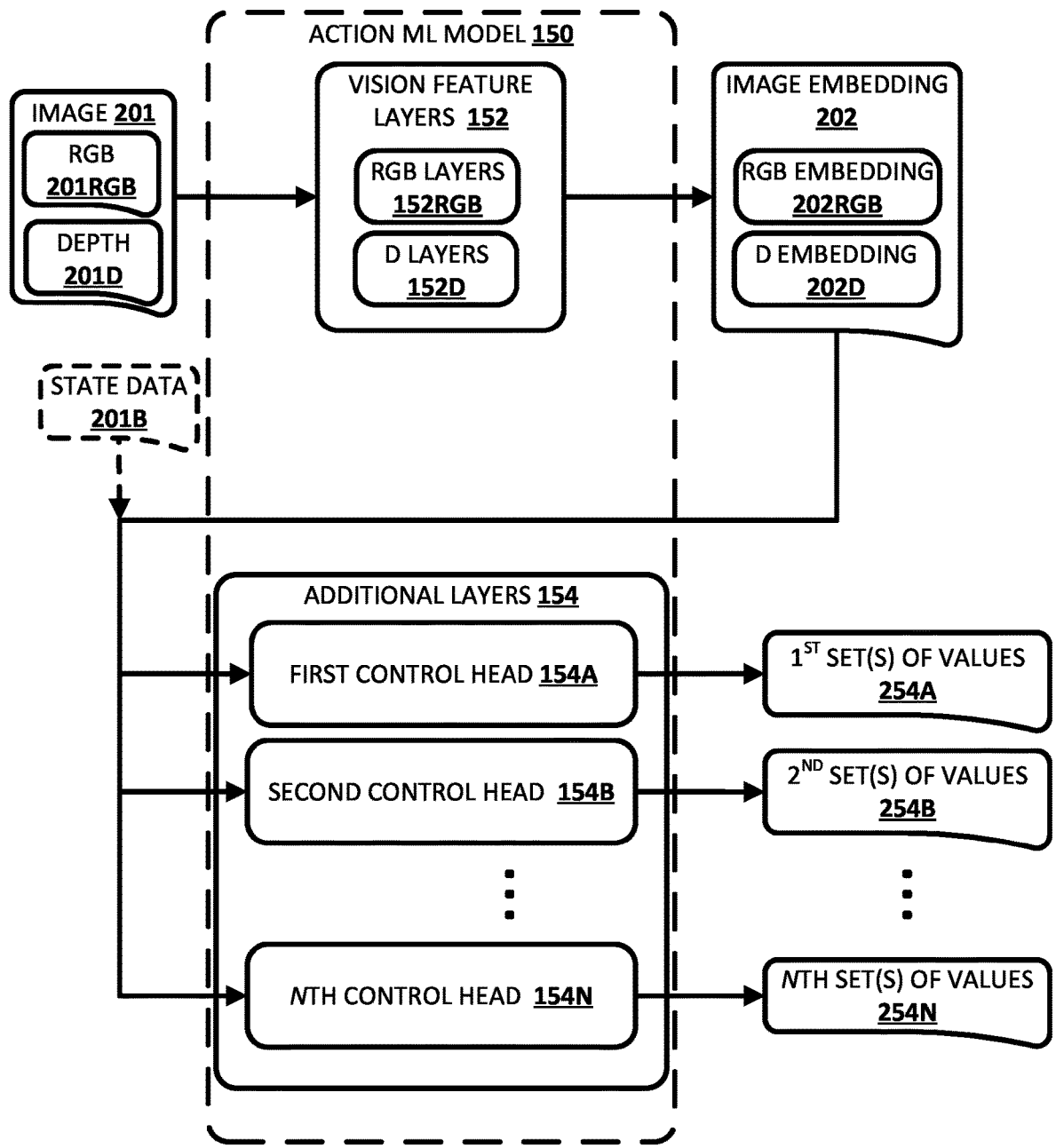
FIG. 2 illustrates an example of an action ML model, and illustrates example inputs that can be processed using the action ML model, and example action outputs that can be generated based on the processing.

FIG. 2 illustrates an example of an action ML model 150, and an example of processing an image 201, and optionally state data 201B, using the action ML model 150. In FIG. 2, the image 201 is illustrated as including RGB channels 201RGB as well as a depth channel 201D. In other implementations, the image 201 can include fewer channels, more channels, and/or alternative channels. For example, the image 201 could include only RGB channels, or could include a grayscale channel and a depth channel, or could include RGB channels as well as additional hyperspectral channel(s).

The image 201 is processed, using vision feature layers 152 of the action ML model 150, to generate an image embedding 202. For example, the RGB channels 201RGB can be processed using RGB layers 152RGB of the vision feature layers 152 to generate an RGB embedding 202RGB, the depth channel 201D processed using depth layers 152 to generate a depth embedding 202D, and the RGB embedding 202RGB and the depth embedding 202D concatenated to generate the image embedding 202. Although separate RGB layers 152RGB and depth layers 152D are illustrated in FIG. 2, in other embodiments a combined set of layers can process both the RGB channels 201RGB and the depth channel 201D.

The image embedding 202 is processed, using additional layers 154 of the action ML model 150, to generate action outputs 254A-N. More particularly, FIG. 2 illustrates generating at least a first action output that includes a 1st set of values 254A, a second action output that includes a 2nd set of values 254B, and an Nth action output that includes an Nth set of values 254N. For example, the 1st set of values 254A can define, directly or indirectly, parameters for movement of a base of a robot (e.g., base 113 of robot 110), such as direction, velocity, acceleration, and/or other parameters(s) of movement. Also, for example, the 2nd set of values 254B can define, directly or indirectly, parameters for movement of an end effector of the robot (e.g., end effector 115 of robot 110), such as translational direction, rotational direction, velocity, and/or acceleration of movement, whether to open or close a gripper, force(s) of moving the gripper translationally, and/or other parameter(s) of movement. Also, for example, the Nth set of values 254N can define, directly or indirectly, whether a current episode of performing a robotic task is to be terminated (e.g., the episode of performing the robotic task is completed). In implementations where additional layers 154 include multiple control heads, more or fewer control heads can be provided. For example, additional action outputs could be generated, as indicated by the vertical ellipses in FIG. 2. For instance, the 2nd set of values 254B can define translational direction of movement for the end effector, an additional unillustrated control head can generate values that define rotational direction of movement for the end effector, and a further additional unillustrated control head can generate values that define whether the end effector should be in an opened position or a closed position.

In generating the 1st set of values 254A, the image embedding 202 can be processed using a first control head 154A that is a unique subset of the additional layers 154. In generating the 2nd set of values 254B, the image embedding 202 can be processed using a second control head 154B that is another unique subset of the additional layers 154. In generating the Nth set of values 254N, the image embedding 202 can be processed using an Nth control head 154N that is yet another unique subset of the additional layers 154. Put another way, the control heads 154A-N can be parallel to one another in the network architecture, and each used processing the image embedding 202 and generating a corresponding action output.

In some implementations, in addition to processing the image embedding 202 using the additional layers, other data can be processed along with the image embedding 202 (e.g., concatenated with the image embedding 202). For example, optional non-image state data 201B can be processed along with the image embedding. The non-image state data 201B can include, for example, robot state data or an embedding of the robot state data. The robot state data can reflect, for example, current pose(s) of component(s) of the robot, such as current joint-space pose(s) of actuators of the robot and/or current Cartesian-space pose(s) of a base and/or of an arm of the robot.

Figure 3A:
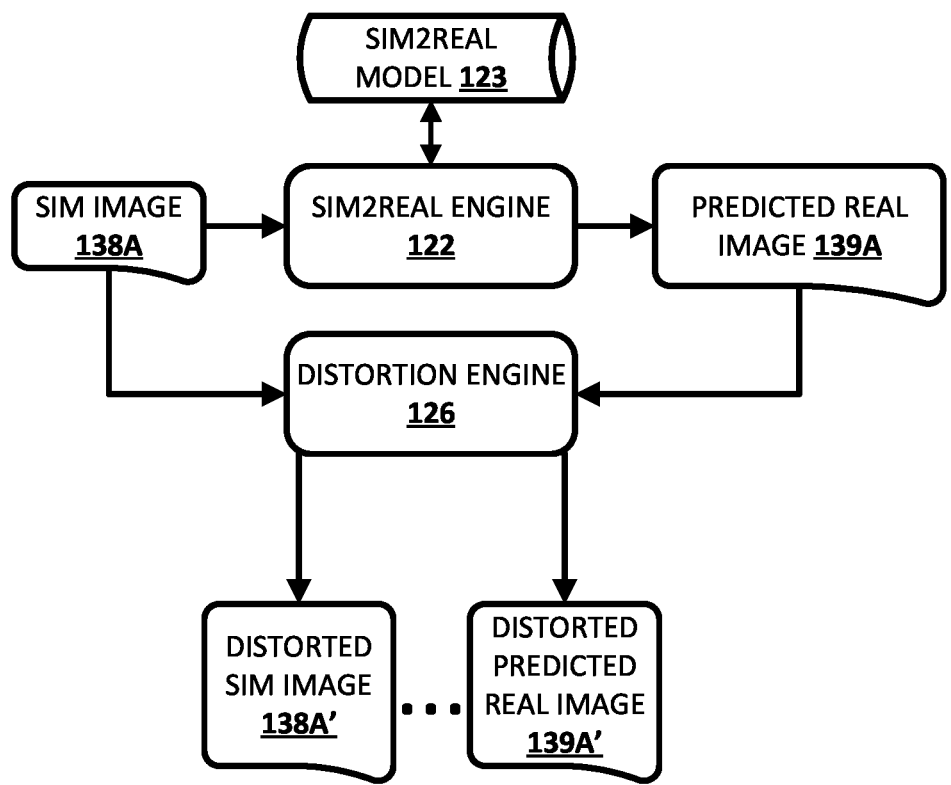
FIG. 3A illustrates an example of processing a simulated image to generate a predicted real image, and generating distortion(s) of the simulated image and distortion(s) of the predicted real image.

FIG. 3A illustrates an example of Sim2Real engine 122 processing a simulated image 138A, using Sim2Real model 123, to generate a predicted real image 139A. FIG. 3A further illustrates distortion engine 126 processing simulated image 138A, using one or more distortion techniques, to generate one or more distorted simulated images, such as distorted simulated image 138A'. FIG. 3A further illustrates distortion engine 126 processing predicted real image 139A, using one or more distortion techniques, to generate one or more distorted predicted real images, such as distorted predicted real image 139A'.

Turning now to FIGS. FIG. 3B1-4, examples are provided of how the processing engine 128 of FIG. 1 can process each of the images 138A, 139A, 138A', and 139A', using the action ML model 150, to generate corresponding image embeddings and corresponding predicted action outputs.

In FIG. 3B1, the simulated image 138A is processed to generate a simulated image embedding 138AE, a 1st set of predicted action outputs 138A01, a 2nd set of predicted action outputs 138A02, and an Nth set of predicted action outputs 138A0N. For example, the 1st set of predicted action outputs 138A01 can be generated using 1st control head 154A (FIG. 2), the 2nd set of predicted action outputs 138A02 can be generated using 2nd control head 154B (FIG. 2), and the Nth set of predicted action outputs 138A0N can be generated using Nth control head 154C (FIG. 3).

In FIG. 3B2, the predicted real image 139A is processed to generate a predicted real image embedding 139AE, a 1st set of predicted action outputs 139A01, a 2nd set of predicted action outputs 139A02, and an Nth set of predicted action outputs 139A0N. Like with FIG. 3B1, the predicted action outputs 139A01-N can be generated using corresponding ones of the control heads 154A-N (FIG. 2).

In FIG. 3B3, the distorted simulated image 138A' is processed to generate a distorted simulated image embedding 138A'E, a 1st set of predicted action outputs 138A'O1, a 2nd set of predicted action outputs 138A'O2, and an Nth set of predicted action outputs 138A'ON. Like with FIG. 3B1, the predicted action outputs 138A'O1-N can be generated using corresponding ones of the control heads 154A-N (FIG. 2).

In FIG. 3B4, the distorted predicted real image 139A' is processed to generate a distorted predicted real image embedding 139A'E, a 1st set of predicted action outputs 139A'O1, a 2nd set of predicted action outputs 139A'O2, and an Nth set of predicted action outputs 139A'ON. Like with FIG. 3B1, the predicted action outputs 138A'O1-N can be generated using corresponding ones of the control heads 154A-N (FIG. 2).

It is noted that, through utilization of the embedding consistency loss described herein, that the action ML model 150, when trained, will generate corresponding embeddings, for each of the counterpart images 138A, 139A, 138A', and 139A', that are similar to one another (or even the same as one another in some situations). However, during training, the embeddings 138AE, 139AE, 138A'E, and 139A'E can vary. Likewise, through utilization of the action consistency loss described herein, the action ML model 150, when trained, will generate corresponding action outputs, for each of the counterpart images 138A, 139A, 138A', and 139A', that are similar to one another (or even the same as one another in some situations). However, during training, the action outputs can vary (e.g., 138A01 can vary from 139A01, 138A'01, and 139A'01).

It is also noted that, in implementations where the images 138A, 139A, 138A' and 139A' include color channel(s) and depth channel, there can be color vision layer(s) and separate depth vision layer(s) in the action ML model 150, and each of the embeddings 138AE, 139AE, 138A'E, and 139A'E can each include a corresponding color embedding (generated using the color vision layer(s)) and a corresponding depth embedding (generated using the depth vision layer(s)).

Figure 3C:
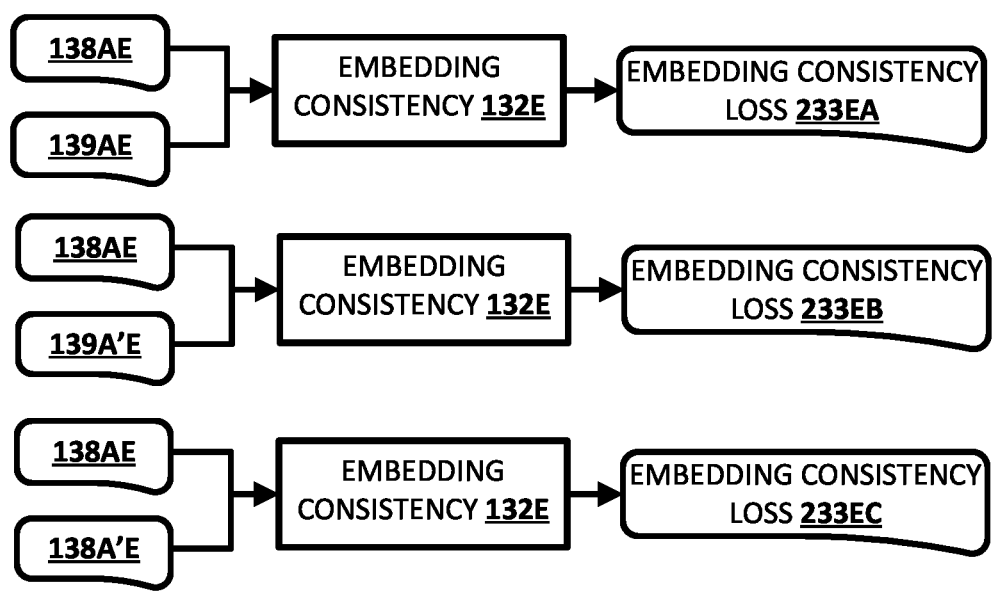
FIG. 3C illustrates an example of individual embedding consistency losses that can be generated based on the generated embeddings of FIGS. 3B1, 3B2, 3B3, and 3B4.

Turning now to FIG. 3C, an example is illustrated of generating individual embedding consistency losses based on the generated embeddings 138AE, 139AE, 138A'E, and 139A'E of FIGS. 3B1, 3B2, 3B3, and 3B4. The embedding consistency component 132E of FIG. 1 generates embedding consistency loss 233EA based on comparison of simulated image embedding 138AE and predicted real image embedding 139AE. For example, the comparison can include generating a Huber loss or other loss based on the comparison. The embedding consistency component 132E of FIG. 1 also generates embedding consistency loss 233EB based on comparison of simulated image embedding 138AE and distorted predicted real image embedding 139A'E. The embedding consistency component 132E of FIG. 1 also generates embedding consistency loss 233EC based on comparison of simulated image embedding 138AE and distorted simulated I image embedding 139A'E. In the example of FIG. 3C the simulated embedding 138AE, of the simulated image 138A, is used as the anchor embedding in each of the comparisons for generating the embedding consistency losses. However, in some implementations an alternate embedding can be used as the anchor, such as the distorted simulated image embedding 138A'E. Further, in some of those implementations the simulated image 138 and simulated image embedding 138AE may be omitted entirely.

It is noted that, in implementations where each of the embeddings 138AE, 139AE, 138A'E, and 139A'E each include a corresponding color embedding (generated using the color vision layer(s)) and a corresponding depth embedding (generated using the depth vision layer(s)), a first set of embedding consistency losses can be generated based on comparisons of the color embeddings and a second set of embedding consistency losses can be generated based on comparisons of the depth embeddings. Further, both the first set and the second sets of embedding consistency losses can be utilized in updating the action ML model 150 as described herein. For example, the first set of embedding consistency losses can be applied to only the color vision feature layers and the second set of embedding consistency losses can be applied to only the depth vision feature layers. As another example, the first and second sets of embedding consistency losses can both contribute to a task consistency loss, that is applied to all layers of the action ML model 150.

Figure 3D:
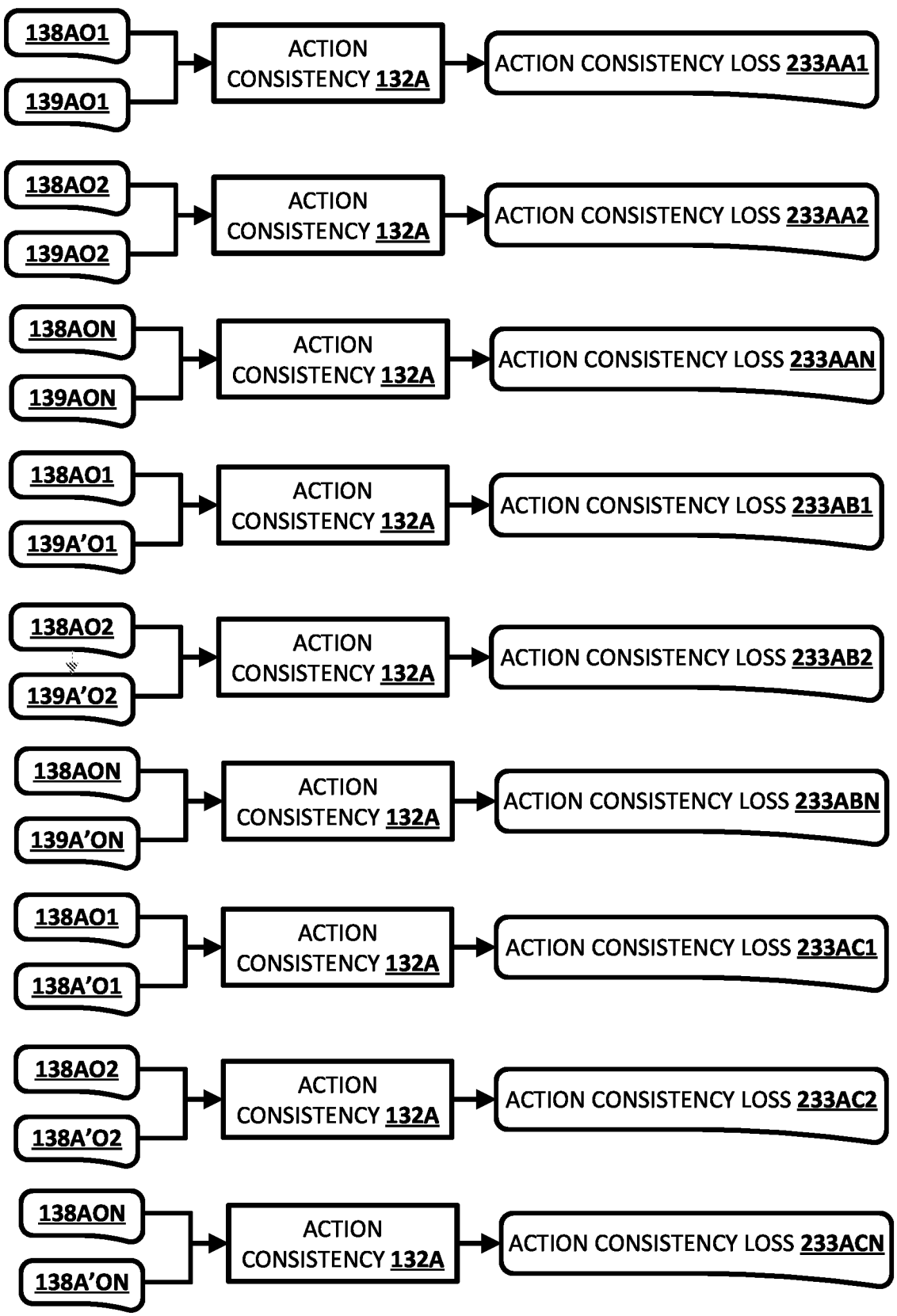
FIG. 3D illustrates an example of individual action consistency losses that can be generated based on the generated predicted action outputs of FIGS. 3B1, 3B2, 3B3, and 3B4.

Turning now to FIG. 3D, an example is illustrated of generating individual action consistency losses based on the generated predicted action outputs 138A01-N, 139A01-N, 138A'01-N, and 139A'01-N of FIGS. 3B1, 3B2, 3B3, and 3B4. More particularly, action consistency component 132A generates: action consistency loss 233AA1 based on comparison of action outputs 138A01 and 139A01; action consistency loss 233AA2 based on comparison of action outputs 138A02 and 139A02; action consistency loss 233AAN based on comparison of action outputs 138A0N and 139A0N; action consistency loss 233AB1 based on comparison of action outputs 138A01 and 139A'01; action consistency loss 233AB2 based on comparison of action outputs 138A01 and 139A'01; action consistency loss 233ABN based on comparison of action outputs 138A0N and 139A'01; action consistency loss 233AC1 based on comparison of action outputs 138AO1 and 138A'O1; action consistency loss 233AC2 based on comparison of action outputs 138AO1 and 138A'O1; and action consistency loss 233ACN based on comparison of action outputs 138A0N and 138A'O1. For example, the comparisons can include generating a Huber loss or other loss based on the comparison. In the example of FIG. 3D the action outputs 138AO1-N, of the simulated image 138A, are used as the anchor action outputs in each of the comparisons for generating the action consistency losses. However, in some implementations alternate action outputs can be used as the anchor, such as the action outputs 138A'O1-N of the distorted simulated image 138A'. Further, in some of those implementations the simulated image 138 and action outputs 138AO1-N can be omitted entirely.

Figure 3E:
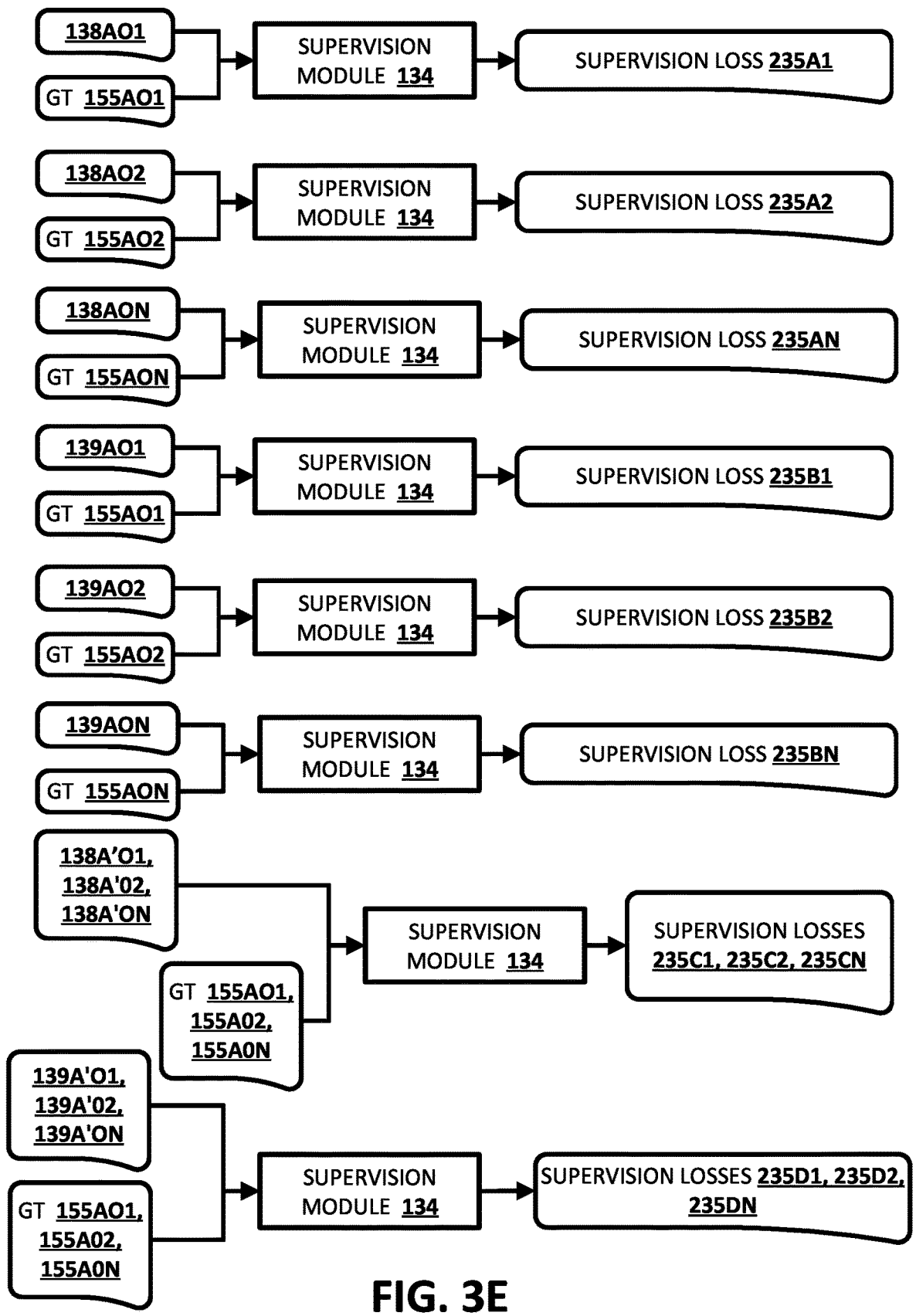
FIG. 3E illustrates an example of individual supervision losses that can be generated based on the generated predicted action outputs of FIGS. 3B1, 3B2, 3B3, and 3B4, and based on ground truth data.

Turning now to FIG. 3E, an example is illustrated of generating individual supervision losses based on ground truth action outputs 155A0-N (e.g., from demonstration data) and based on the generated predicted action outputs 138AO1-N, 139AO1-N, 138A'O1-N, and 139A'O1-N of FIGS. 3B1, 3B2, 3B3, and 3B4. More particularly, supervision module 134 generates: supervision loss 235A1 based on comparison of action output 138AO1 and ground truth action output 155A01; supervision loss 235A2 based on comparison of action output 138AO2 and ground truth action output 155A02; supervision loss 235A3 based on comparison of action output 138AO3 and ground truth action output 155A03; supervision loss 235B1 based on comparison of action output 139AO1 and ground truth action output 155B01; supervision loss 235B2 based on comparison of action output 139AO2 and ground truth action output 155B02; supervision loss 235B3 based on comparison of action output 139AO3 and ground truth action output 155B03; supervision loss 235C1 based on comparison of action output 138A'O1 and ground truth action output 155A01; supervision loss 235C2 based on comparison of action output 138A'O2 and ground truth action output 155A02; supervision loss 235C3 based on comparison of action output 138A'O3 and ground truth action output 155A03; supervision loss 235D1 based on comparison of action output 139A'O1 and ground truth action output 155B01; supervision loss 235D2 based on comparison of action output 139A'O2 and ground truth action output 155B02; and supervision loss 235D3 based on comparison of action output 139A'O3 and ground truth action output 155B03.

Figure 3F:
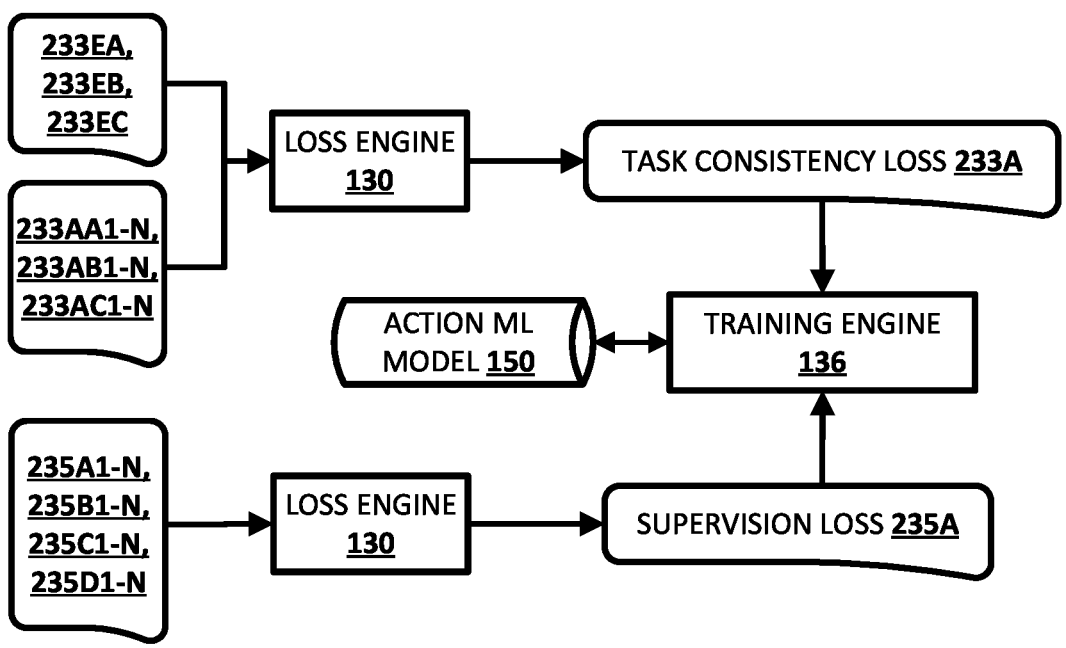
FIG. 3F illustrates an example of generating task consistency loss(es) based on the individual embedding consistency losses of FIG. 3C and the individual action consistency losses of FIG. 3D, and generating supervision loss(es) based on the individual supervision losses of FIG. 3E.

Turning now to FIG. 3F, an example is provided of updating the action ML model 150 based on the losses of FIGS. 3C, 3D, and 3E. In FIG. 3F, loss engine 130 generates a task consistency loss 233A as a function of the embedding consistency losses 233EA, 233EB, and 233EC and the action consistency losses 233AA1-N, 233AB1-N, and 233AC1-N. For example, the loss engine 130 can generate an overall task consistency loss based on a sum of the embedding consistency losses 233EA, 233EB, and 233EC and the action consistency losses 233AA1-N, 233AB1-N, and 233AC1-N. In FIG. 3F, loss engine 130 also generates a supervision loss 235A as a function of the supervision losses 235A1-N, 235B1-N, 235C1-N, and 235D1-N. For example, the loss engine 130 can generate the overall supervision loss based on a sum of the supervision losses 235A1-N, 235B1-N, 235C1-n, and 235D1-N. In FIG. 3F, the training engine 136 updates action ML model 150 based on the task consistency loss 233A and the supervision loss 235A. For example, the training engine 136 can backpropagate a sum of the losses across the entire action ML model 150. Although FIG. 3F illustrates a particular example of updating the action ML model 150 based on the losses of FIGS. 3C, 3D, and 3E, alternative manners of updating the action ML model 150 based on the losses can be utilized. For example, the task consistency loss can be based on only the embedding consistency losses 233EA, 233EB, and 233EC or, instead, based only on the action consistency losses 233AA1-N, 233AB1-N, and 233AC1-N. As another example, an overall embedding consistency loss, based only on the embedding consistency losses 233EA, 233EB, and 233EC, can be applied to only the vision feature layers 152A of the action ML model 150 and an overall loss based on the action consistency losses and the supervision losses applied to all layers of the action ML model 150. As yet another example, individual action consistency losses and/or individual supervision losses can be attributed to only the corresponding control head responsible for those losses. For example, a loss to be applied to 1st control head 154A1 can be based on action consistency losses 233AA1, 233AB1, 233AC1 and supervision losses 235A1, 235B1, 235C1, and 235D1—but not based on any other action consistency losses or supervision losses. Likewise, a loss to be applied to 2nd control head 154A2 can be based on action consistency losses 233AA2, 233AB2, 233AC2 and supervision losses 235A2, 235B2, 235C2, and 235D2—but not based on any other action consistency losses or supervision losses.

Figure 4A:
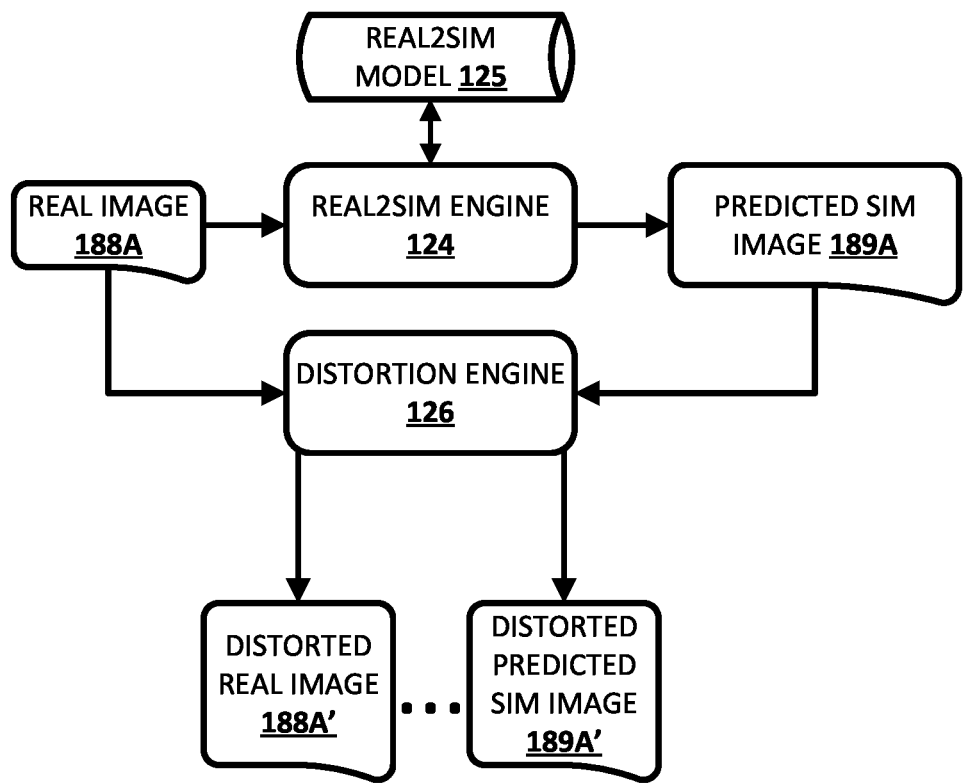
FIG. 4A illustrates an example of processing a real image to generate a predicted simulated image, and generating distortion(s) of the real image and distortion(s) of the predicted simulated image.

FIG. 4A illustrates an example of Real2Sim engine 122 processing a real image 188A, using Real2Sim model 124, to generate a predicted simulated image 189A. FIG. 4A further illustrates distortion engine 126 processing real image 188A, using one or more distortion techniques, to generate one or more distorted real images, such as distorted real image 188A'. FIG. 4A further illustrates distortion engine 126 processing predicted simulated image 189A, using one or more distortion techniques, to generate one or more distorted predicted simulated images, such as distorted predicted simulated image 189A'.

Figure 4B:
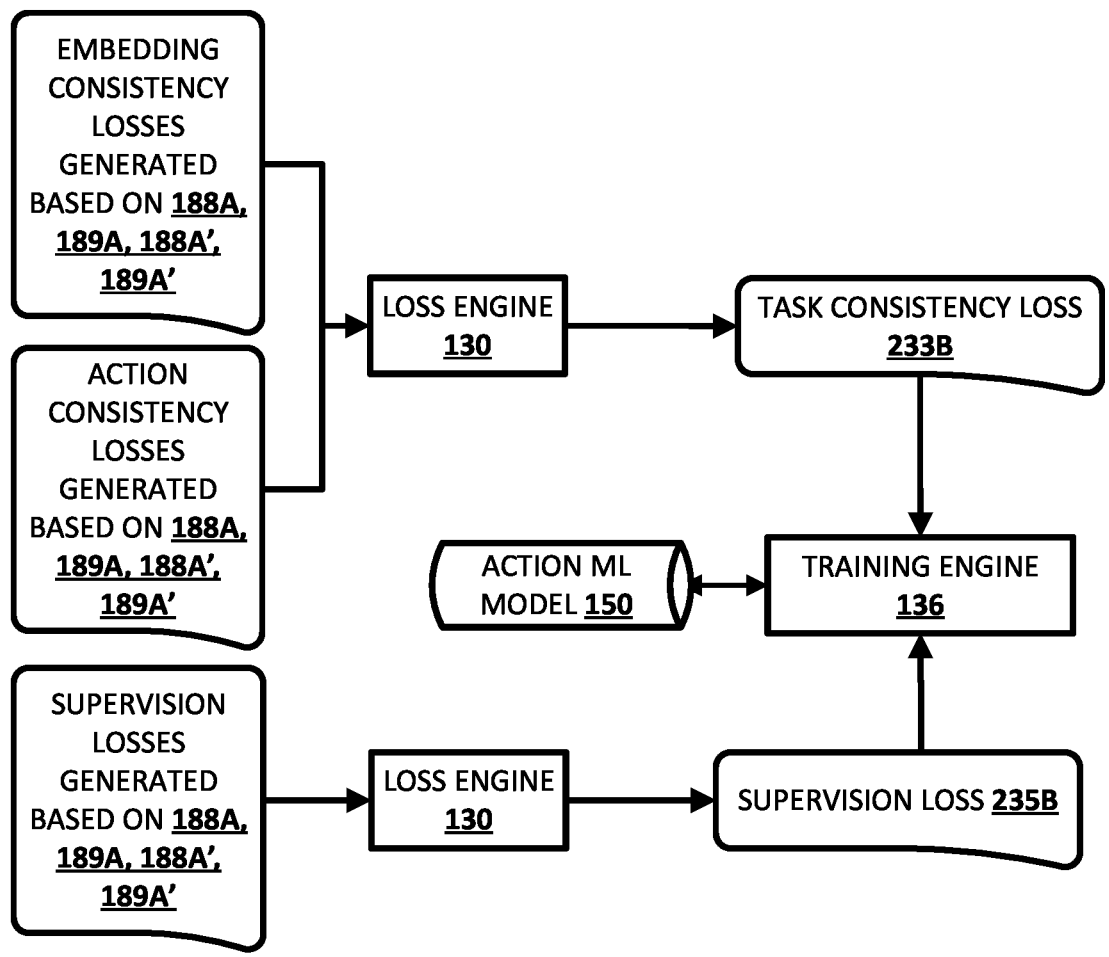
FIG. 4B illustrates an example of generating task consistency loss(es) based on individual embedding consistency losses and individual action consistency losses of generated based on the images of FIG. 4A, and generating supervision loss(es) based on the images of FIG. 4A.

FIG. 4B illustrates an example of updating the action ML model 150 based on individual embedding consistency losses, individual action consistency losses, and individual supervision losses that are generated based on images 188A, 189A, 188A', and 189A' of FIG. 4A. More particularly, based on embeddings or action outputs based on processing such images using the action ML model 150. Such losses can be generated in a similar manner as described above with respect to FIGS. 3C, 3D, and 3E, and detailed description is omitted herein for brevity. In FIG. 4B, loss engine 130 generates a task consistency loss 233B as a function of the individual embedding consistency losses and the individual action consistency losses. For example, the loss engine 130 can generate an overall task consistency loss based on a sum of the individual embedding consistency losses and the individual action consistency losses. In FIG. 4B, loss engine 130 also generates a supervision loss 235B as a function of the individual supervision losses. For example, the loss engine 130 can generate the overall supervision loss based on a sum of the individual supervision losses. In FIG. 4B, the training engine 136 updates action ML model 150 based on the task consistency loss 233B and the supervision loss 235B. For example, the training engine 136 can backpropagate a sum of the losses across the entire action ML model 150. Although FIG. 4B illustrates a particular example of updating the action ML model 150 based on the losses, alternative manners of updating the action ML model 150 based on the losses can be utilized, such as those described herein.

Figure 5:
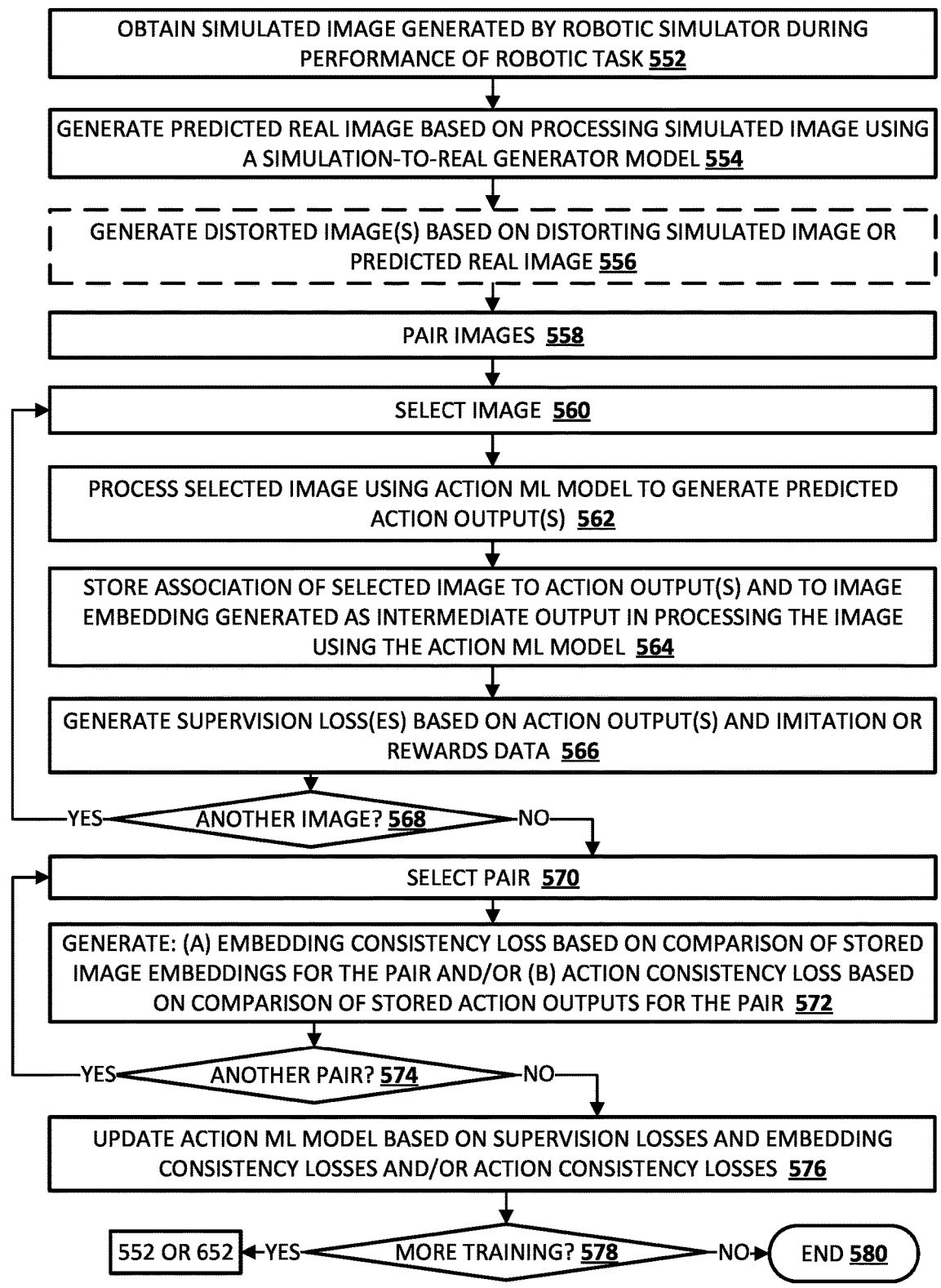
FIG. 5 is a flowchart illustrating an example method in accordance with various implementations disclosed herein.

FIG. 5 is a flowchart illustrating an example method 500 in accordance with various implementations disclosed herein. For convenience, the operations of the method 500 are described with reference to a system that performs the operations. This system may include one or more processors, such as processor(s) of training system 120. Moreover, while operations of method 500 are shown in a particular order, this is not meant to be limiting. One or more operations may be reordered, omitted or added.

At block 552, the system obtains a simulated image generated by a robotic simulator during performance of a robotic task.

At block 554, the system generates a predicted real image based on processing the simulated image using a simulation-to-real generator model.

At optional block 556, the system generates one or more distorted images. The distorted images can include distorted simulated image(s) that are each generated based on applying distortion technique(s) to the simulated image. The distorted images can additionally or alternatively include distorted predicted real image(s) that are each generated based on applying distortion technique(s) to the predicted real image.

At block 558, the system pairs images, from those of a most recent iteration of blocks 552, 554, and 556. For example, the simulated image can be paired with the predicted real image, the simulated image can be paired with a distorted simulated image, a distorted simulated image can be paired with another distorted simulated image, a distorted simulated image can be paired with a distorted predicted real image, and/or other paring(s) can be performed.

At block 560, the system selects an image, from those of a most recent iteration of blocks 552, 554, and 556. For example, the simulated image can be selected in a first iteration, the predicted real image selected in a second iteration, a distorted simulated image selected in a third iteration, etc.

At block 562, the system processes the selected image using an action ML model to generated predicted action output(s). In doing so, the system can process the selected image, using vision feature layers of the action ML model, to generate an image embedding as intermediate output, and process the image embedding using additional layers of the action ML model to generate the predicted action output(s).

At block 564, the system stores an association of the selected image to the action outputs and to the image embedding generated as intermediate output.

At block 566, the system generates supervision loss(es), based on the action output(s) and imitation or rewards data. For example, the system can generate supervision loss(es) based on comparing the action output(s) to ground truth imitation data that corresponds to the simulated image (e.g., based on action(s) applied at a time of the simulated image during a simulated human-guided demonstration). As another example, the system can alternatively generate supervision loss(es) based on a reward for a simulated RL episode from which the simulated image was obtained.

At block 568, the system determines whether there are additional image(s) to process, from those of a most recent iteration of blocks 552, 554, and 556. If so, the system returns to block 560, selects an additional image, and performs blocks 562, 564, and 566 for the additional image. If not, the system proceeds to block 570.

At block 570, the system selects a pair of the images, from the pairings generated at block 558.

At block 572, the system generates (a) an embedding consistency loss based on comparison of stored image embeddings for the pair and/or (b) an action consistency loss based on comparison of stored action outputs for the pair.

At block 574, the system determines whether there are additional pairs to process, from those of a most recent iteration of block 558. If so, the system returns to block 570, selects the additional pair, and performs block 572 for the additional pair. If not, the system proceeds to block 576.

At block 576, the system updates the action ML model based on supervision losses (from iterations of block 566) and based on the embedding consistency losses and/or the action consistency losses (from iterations of block 572). For example, an overall loss can be generated that is a function of the supervision losses, the embedding consistency losses, and the action consistency losses. Further, the overall loss can be applied to the entire action ML model. For instance, the overall loss can be backpropagated over the entire action ML model, with some of the loss being applied to the additional layers and a residual of the loss applied to the vision feature layers. As another example, a combination of the supervision losses and the action consistency losses can be applied to the entire action ML model, and a combination of the embedding consistency losses applied to only the vision feature layers of the action ML model. As yet another example, for each of multiple control heads of the additional layers, a corresponding loss can be generated that is a function of at least the supervision losses and the action consistency losses that are attributable to that control head. Each of the corresponding losses can be applied to the corresponding control head, with residuals being applied to the vision feature layers. In such an example, the corresponding losses can also be a function of the embedding losses or, alternatively, a combination of the embedding consistency losses applied to only the vision feature layers of the action ML model.

At block 578, the system determines whether additional training is to be performed. If so, the system proceeds to block 552 or to block 652 of FIG. 6 (described below). If not, training ends at block 580. In some implementations, in determining whether additional training is to be performed, the system determines whether one or more training criteria are satisfied. Such criteria can include, for example, training for a threshold quantity of epochs, training based on a threshold quantity of images, training for a threshold duration of time, and/or validation of the currently trained action ML model.

Figure 6:
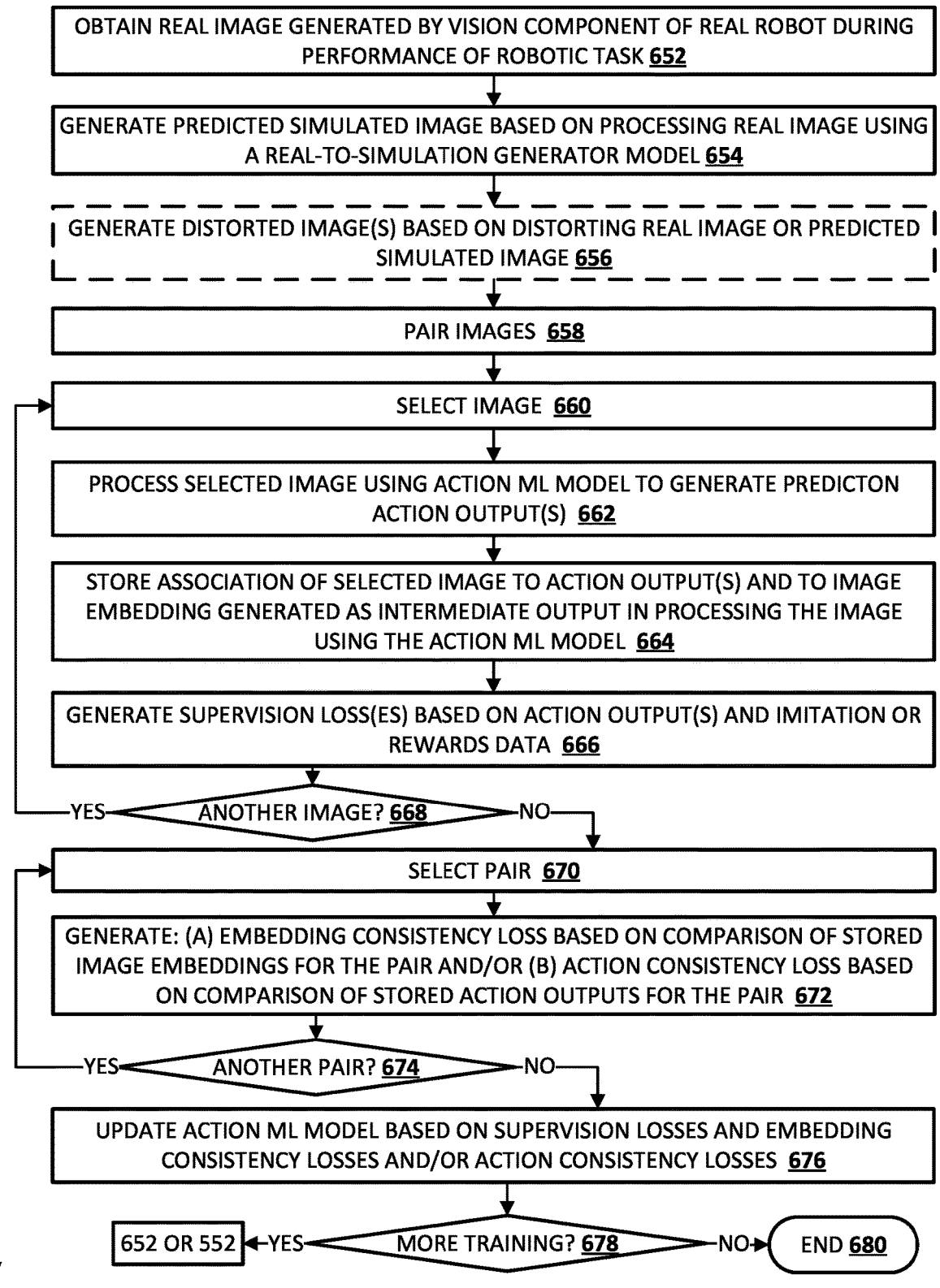
FIG. 6 is a flowchart illustrating another example method in accordance with various implementations disclosed herein.

FIG. 6 is a flowchart illustrating another example method 600 in accordance with various implementations disclosed herein. For convenience, the operations of the method 600 are described with reference to a system that performs the operations. This system may include one or more processors, such as processor(s) of training system 120. Moreover, while operations of method 600 are shown in a particular order, this is not meant to be limiting. One or more operations may be reordered, omitted or added.

At block 652, the system obtains a simulated image generated by a vision component of a real robot during performance of a robotic task.

At block 654, the system generates a predicted simulated image based on processing the real image using a real-to-simulation generator model.

At optional block 656, the system generates one or more distorted images. The distorted images can include distorted real image(s) that are each generated based on applying distortion technique(s) to the real image. The distorted images can additionally or alternatively include distorted predicted simulated image(s) that are each generated based on applying distortion technique(s) to the predicted simulated image.

At block 658, the system pairs images, from those of a most recent iteration of blocks 652, 654, and 656. For example, the real image can be paired with the predicted simulated image, the real image can be paired with a distorted real image, a distorted real image can be paired with another distorted real image, a distorted real image can be paired with a distorted predicted simulated image, and/or other paring(s) can be performed.

At block 660, the system selects an image, from those of a most recent iteration of blocks 652, 654, and 656. For example, the real image can be selected in a first iteration, the predicted simulated image selected in a second iteration, a distorted real image selected in a third iteration, etc.

At block 662, the system processes the selected image using an action ML model to generated predicted action output(s). In doing so, the system can process the selected image, using vision feature layers of the action ML model, to generate an image embedding as intermediate output, and process the image embedding using additional layers of the action ML model to generate the predicted action output(s).

At block 664, the system stores an association of the selected image to the action outputs and to the image embedding generated as intermediate output.

At block 666, the system generates supervision loss(es), based on the action output(s) and imitation or rewards data. For example, the system can generate supervision loss(es) based on comparing the action output(s) to ground truth imitation data that corresponds to the real image (e.g., based on action(s) applied at a time of the real image during a real human-guided demonstration). As another example, the system can alternatively generate supervision loss(es) based on a reward for a real RL episode from which the real image was obtained.

At block 668, the system determines whether there are additional image(s) to process, from those of a most recent iteration of blocks 652, 654, and 656. If so, the system returns to block 660, selects an additional image, and performs blocks 662, 664, and 666 for the additional image. If not, the system proceeds to block 670.

At block 670, the system selects a pair of the images, from the pairings generated at block 658.

At block 672, the system generates (a) an embedding consistency loss based on comparison of stored image embeddings for the pair and/or (b) an action consistency loss based on comparison of stored action outputs for the pair.

At block 674, the system determines whether there are additional pairs to process, from those of a most recent iteration of block 658. If so, the system returns to block 670, selects the additional pair, and performs block 672 for the additional pair. If not, the system proceeds to block 676.

At block 676, the system updates the action ML model based on supervision losses (from iterations of block 666) and based on the embedding consistency losses and/or the action consistency losses (from iterations of block 672). For example, an overall loss can be generated that is a function of the supervision losses, the embedding consistency losses, and the action consistency losses. Further, the overall loss can be applied to the entire action ML model. For instance, the overall loss can be backpropagated over the entire action ML model, with some of the loss being applied to the additional layers and a residual of the loss applied to the vision feature layers. As another example, a combination of the supervision losses and the action consistency losses can be applied to the entire action ML model, and a combination of the embedding consistency losses applied to only the vision feature layers of the action ML model. As yet another example, for each of multiple control heads of the additional layers, a corresponding loss can be generated that is a function of at least the supervision losses and the action consistency losses that are attributable to that control head. Each of the corresponding losses can be applied to the corresponding control head, with residuals being applied to the vision feature layers. In such an example, the corresponding losses can also be a function of the embedding losses or, alternatively, a combination of the embedding consistency losses applied to only the vision feature layers of the action ML model.

At block 678, the system determines whether additional training is to be performed. If so, the system proceeds to block 652 or to block 552 of FIG. 5 (described above). If not, training ends at block 680. In some implementations, in determining whether additional training is to be performed, the system determines whether one or more training criteria are satisfied.

Figure 7:
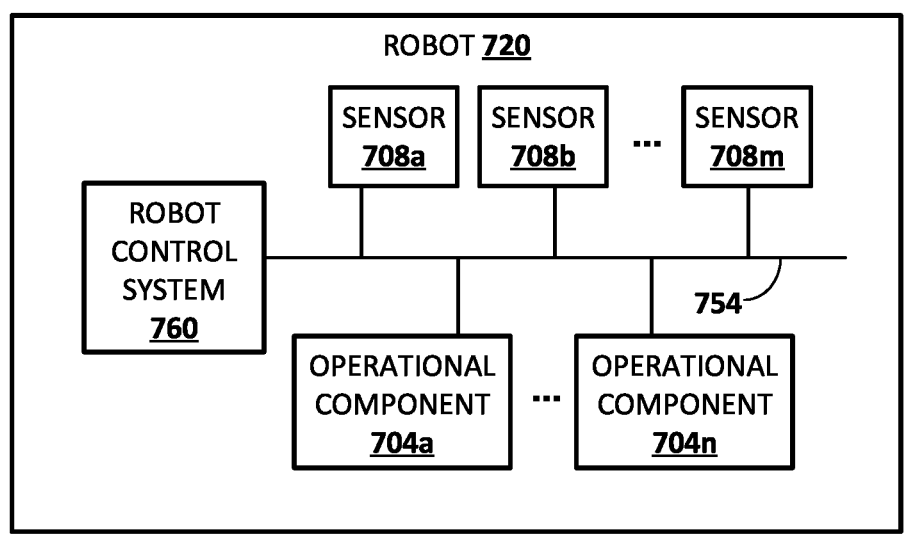
FIG. 7 schematically depicts an example architecture of a robot, in accordance with various implementations disclosed herein.

FIG. 7 schematically depicts an example architecture of a robot 720. The robot 720 includes a robot control system 760, one or more operational components 704a-n, and one or more sensors 708a-m. The sensors 708a-m can include, for example, vision components, pressure sensors, positional sensors, pressure wave sensors (e.g., microphones), proximity sensors, accelerometers, gyroscopes, thermometers, barometers, and so forth. While sensors 708a-m are depicted as being integral with robot 720, this is not meant to be limiting. In some implementations, sensors 708a-m may be located external to robot 720, e.g., as standalone units.

Operational components 704a-n can include, for example, one or more end effectors (e.g., grasping end effectors) and/or one or more servo motors or other actuators to effectuate movement of one or more components of the robot. For example, the robot 720 can have multiple degrees of freedom and each of the actuators can control actuation of the robot 720 within one or more of the degrees of freedom responsive to control commands provided by the robot control system 760 (e.g., torque and/or other commands generated based on action outputs from a trained action ML model). As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator can comprise providing the control command to a driver that translates the control command into appropriate signals for driving an electrical or mechanical device to create desired motion.

The robot control system 760 can be implemented in one or more processors, such as a CPU, GPU, and/or other controller(s) of the robot 720. In some implementations, the robot 720 may comprise a "brain box" that may include all or aspects of the control system 760. For example, the brain box may provide real time bursts of data to the operational components 704a-n, with each of the real time bursts comprising a set of one or more control commands that dictate, inter alia, the parameters of motion (if any) for each of one or more of the operational components 704a-n. In various implementations, the control commands can be at least selectively generated by the control system 760 based at least in part on selected robot actions and/or other determination(s) made using an action machine learning model that is stored locally on the robot 720 and that is trained according to implementations described herein.

Although control system 760 is illustrated in FIG. 7 as an integral part of the robot 720, in some implementations, all or aspects of the control system 760 can be implemented in a component that is separate from, but in communication with, robot 720. For example, all or aspects of control system 760 may be implemented on one or more computing devices that are in wired and/or wireless communication with the robot 720, such as computing device 810 of FIG. 8.

Figure 8:
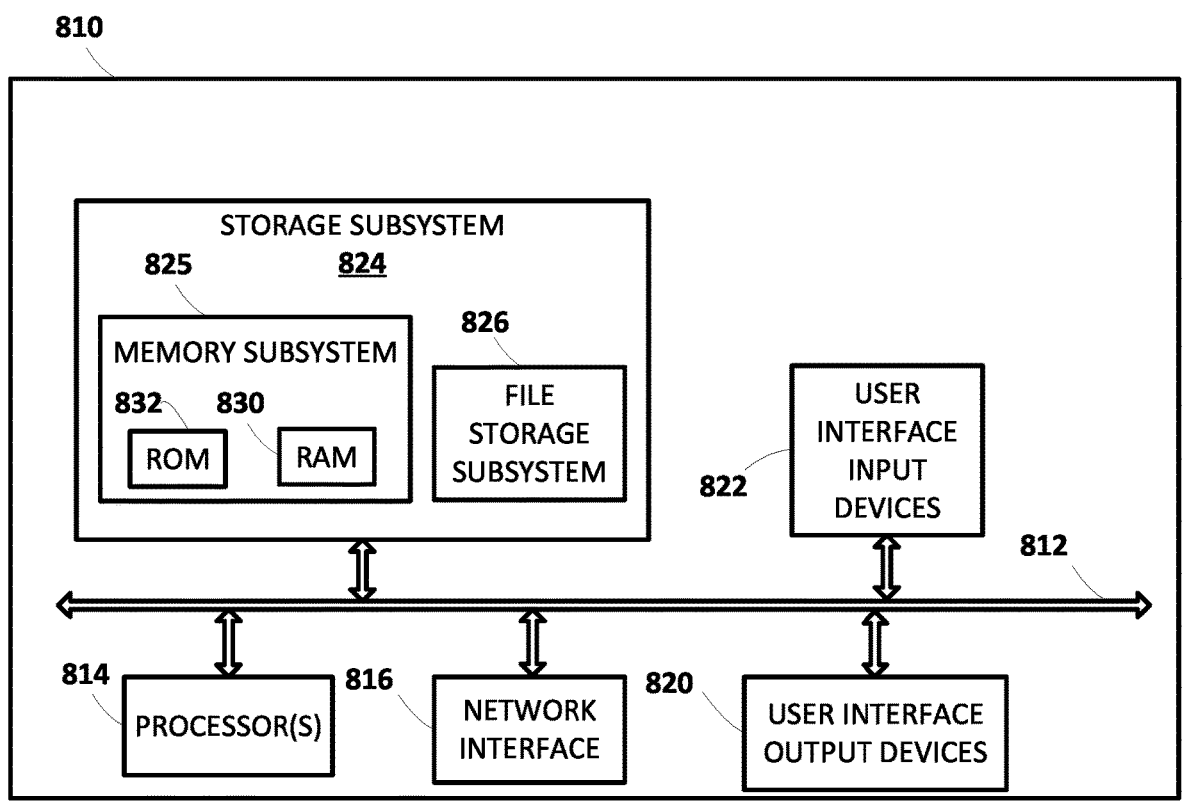
FIG. 8 schematically depicts an example architecture of a computer system, in accordance with various implementations disclosed herein.

FIG. 8 is a block diagram of an example computing device 810 that can optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 can include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of one or more methods described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple buses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In some implementations, a method implemented by one or more processors is provided and includes generating a predicted real image based on processing a simulated image using a simulation-to-real generator model. The simulated image is generated by a robotic simulator during performance of a robotic task by a simulated robot of the robotic simulator. The method further includes, in response to the predicted real image being generated based on processing the simulated image using the simulation-to-real generator model: pairing the simulated image with the predicted real image. The method further includes processing the simulated image, using an action machine learning model being trained for use in controlling a robot to perform the robotic task, to generate one or more simulated image predicted action outputs. Processing the simulated image includes: generating a simulated image embedding by processing the simulated image using vision feature layers of the action machine learning model; and processing the simulated image embedding using additional layers of the action machine learning model to generate the simulated image predicted action outputs. The method further includes processing the predicted real image, using the action machine learning model, to generate one or more predicted real image predicted action outputs. Processing the predicted real image includes: generating a predicted real image embedding by processing the predicted real image using the vision feature layers; and processing the predicted real image embedding using the additional layers to generate the real image predicted action outputs. The method further includes, in response to the pairing of the simulated image with the predicted real image: generating an embedding consistency loss as a function of comparison of the simulated image embedding and the predicted real image embedding; and updating the vision feature layers based on the generated embedding consistency loss.

These and other implementations of the technology disclosed herein can optionally include one or more of the following features.

In some implementations, updating the vision feature layers based on the generated embedding consistency loss includes backpropagating the loss across the vision feature layers without backpropagating the loss across the additional layers. In some of those implementations, the method further includes backpropagating an action consistency loss and/or a supervision loss across the additional layers and the vision layers.

In some implementations, updating the vision feature layers based on the generated embedding consistency loss includes backpropagating the embedding consistency loss across the additional layers and the vision feature layers. In some versions of those implementations, backpropagating the embedding consistency loss across the additional layers and the vision feature layers includes generating a combined loss that is based on the embedding consistency loss and one or more additional losses, and backpropagating the combined loss across the additional layers and the vision feature layers. In some of those versions, the one or more additional losses include an action consistency loss and/or a supervision loss.

In some implementations, the method further includes, in response to the paring of the simulated image with the predicted real image: generating one or more action consistency losses as a function of one or more action output comparisons that are each between a corresponding one of the simulated image predicted action outputs and a corresponding one of the predicted real image predicted action outputs; and updating the vision feature layers further based on the one or more action consistency losses. In some versions of those implementations: the additional layers include a first control head and a second control head; the simulated image predicted action outputs include a first simulated image predicted action output generated using the first control head and a second simulated image predicted action output generated using the second control head; and the predicted real image predicted action outputs include a first predicted real image predicted action output generated using the first control head and a second predicted real image predicted action output generated using the second control head. In some of those versions, generating the action consistency losses includes: generating a first action consistency loss based on comparison of the first simulated image predicted action output and the first predicted real image predicted action output; generating a second action consistency loss based on comparison of the second simulated image predicted action output and the second predicted real image predicted action output; and generating the action consistency loss as a function of the first action consistency loss and the second action consistency loss. Further, in some of those versions, in response to the paring of the simulated image with the predicted real image, the method further includes: backpropagating the first action consistency loss across the first control head; and backpropagating the second action consistency loss across the second control head. Updating the vision feature layers further based on the one or more action consistency losses can include backpropagating residuals, of the first action consistency loss and the second action consistent loss, across the vision feature layers. Optionally, the first simulated image predicted action output and the first predicted real image predicted action output each define a corresponding first set of values for controlling a first robotic component, and the second simulated image predicted action output and the second predicted real image predicted action output each define a corresponding second set of values for controlling a second robotic component. For example, the first robotic component can be one of a robot arm, a robot end effector, a robot base, or a robot head, and the second robotic component can be another one of the robot arm, the robot end effector, the robot base, or the robot head.

In some implementations, the method further includes: distorting the simulated image, using one or more distortion techniques, to generate a distorted simulated image; pairing the distorted simulated image with the predicted real image; processing the distorted simulated image, using the action machine learning model, to generate one or more distorted simulated image predicted action outputs, where processing the distorted simulated image includes:
generating a distorted simulated image embedding by processing the distorted simulated image using the vision feature layers, and processing the distorted simulated image embedding using the additional layers to generate the distorted simulated image predicted action outputs; and in response to the paring of the distorted simulated image with the predicted real image:
generating an additional embedding consistency loss as a function of comparison of the distorted simulated image embedding and the predicted real embedding, and updating the vision feature layers based on the generated additional embedding consistency loss.

In some implementations, the method further includes: distorting the simulated image, using one or more distortion techniques, to generate a distorted simulated image; pairing the distorted simulated image with the simulated image; processing the distorted simulated image, using the action machine learning model, to generate one or more distorted simulated image predicted action outputs, where processing the distorted simulated image includes: generating a distorted simulated image embedding by processing the distorted simulated image using the vision feature layers, and processing the distorted simulated image embedding using the additional layers to generate the distorted simulated image predicted action outputs; and in response to the paring of the distorted simulated image with the simulated image: generating an additional embedding consistency loss as a function of comparison of the distorted simulated image embedding and the simulated image embedding, and updating the vision feature layers based on the generated additional embedding consistency loss.

In some implementations, generating the predicted real image includes: processing the simulated image using the simulation-to-real generator model to generate, as direct output from the simulation-to-real generator model, an original predicted real image; and distorting the original predicted real image, using one or more distortion techniques, to generate the predicted real image. In some of those or other implementations, the one or more distortion techniques include: applying a crop, adjusting brightness, adjusting saturation, adjusting hue, adjusting contrast, applying a cutout, and/or adding Gaussian noise.

In some implementations, the method further includes: generating a first action supervision loss based on comparing the simulated image predicted action outputs to supervised action outputs; generating a second action supervision loss based on comparing the predicted real image predicted action outputs to the supervised action outputs; and updating the machine learning model further based on the first action supervision loss and the second action supervision loss.

In some implementations, the method further includes: generating a first action loss based on a reward function and controlling of a simulated robot using the simulated image predicted action outputs; generating a second action loss based on the reward function and controlling of the simulated robot using the predicted real image predicted action outputs; and updating the machine learning model further based on the first action supervision loss and the second action supervision loss.

In some implementations, the method further includes: subsequent to updating the vision layers based on the generated embedding consistency loss, and subsequent to determining that further training of the machine learning model satisfies one or more training criteria: using the machine learning model in controlling a real robot to perform the robotic task. In some of those implementations, using the machine learning model in controlling the real robot to perform the robotic task includes: processing a real image, captured by one or more vision components of the real robot, using the action machine learning model, to generate one or more real image predicted action outputs, where processing the real image includes: generating a real image embedding by processing the real image using the vision feature layers, and processing the real image embedding using the additional layers to generate the real image predicted action outputs; and controlling one or more components of the real robot using the real image predicted action outputs.

In some implementations, the simulated image includes multiple color channels. In some versions of those implementations, the simulated image further includes at least one additional channel, the at least one additional channel being a depth channel and/or a segmentation mask channel. In some of those versions, processing the simulated image, using the simulation-to-real generator model, to generate the predicted real image, includes processing the color channels and the at least one additional channel using a single simulation-to-real generator model. The simulated image embedding can, in some of those versions, be a single embedding generated by processing the color channels and the at least one additional channel together using the vision layers. The simulated image embedding can, in some other of those versions, be a first embedding of the multiple color channels and a second embedding of the at least one additional channel.

In some implementations, processing the simulated image, using the simulation-to-real generator model, to generate the predicted real image, includes: processing the color channels using a first simulation-to-real generator model; and processing the at least one additional channel using a second simulation-to-real generator model. In some versions of those implementations, the simulated image embedding includes a color channels embedding generated by processing the color channels using a first branch of the vision layers and an additional embedding generated by processing the at least one additional channel using a second branch of the vision layers. In some of those versions, generating the embedding consistency loss includes: generating a color channels embedding consistency loss based on comparison of the color channels embedding and a predicted real color channels embedding generated by processing the color channels of the predicted real image using the first branch, and generating an additional embedding consistency loss based on comparison of the additional embedding and a predicted real additional embedding generated by processing the additional channel of the predicted real image using the second branch. In such versions, updating the visional layers based on the embedding consistency loss can include: updating the first branch based on the color channels embedding consistency loss, and updating the second branch based on the additional embedding consistency loss.

In some implementations, a method implemented by one or more processors, the method is provided and includes generating a predicted simulated image based on processing a real image using a real-to-simulation generator model. The real image is generated by one or more vision components of a robot during performance of a robotic task by the robot. The method further includes, in response to the predicted simulated image being generated by processing the real image using the real-to-simulation generator model: pairing the real image with the predicted simulated image. The method further includes, processing the real image, using an action machine learning model being trained for use in controlling a robot to perform the robotic task, to generate one or more real image predicted action outputs. Processing the real image includes: generating a real image embedding by processing the real image using vision feature layers of the action machine learning model; and processing the real image embedding using additional layers of the action machine learning model to generate the real image predicted action outputs. The method further includes processing the predicted simulated image, using the action machine learning model, to generate one or more predicted simulated image predicted action outputs. Processing the predicted simulated image includes: generating a simulated real image embedding by processing the predicted simulated image using the vision feature layers; and processing the predicted simulated embedding using the additional layers to generate the predicted simulated image predicted action outputs. The method further includes, in response to the pairing of the real image with the predicted simulated image: generating an embedding consistency loss as a function of comparison of the real image embedding and the predicted simulated image embedding; and updating the vision feature layers based on the generated embedding consistency loss.

What is claimed is:

1. A method implemented by one or more processors, the method comprising:
   generating a predicted real image based on processing a simulated image using a simulation-to-real generator model,
      wherein the simulated image is generated by a robotic simulator during performance of a robotic task by a simulated robot of the robotic simulator;
   in response to the predicted real image being generated based on processing the simulated image using the simulation-to-real generator model:
      pairing the simulated image with the predicted real image;
   processing the simulated image, using an action machine learning model being trained for use in controlling a robot to perform the robotic task, to generate one or more simulated image predicted action outputs, wherein processing the simulated image comprises:
      generating a simulated image embedding by processing the simulated image using vision feature layers of the action machine learning model; and
      processing the simulated image embedding using additional layers of the action machine learning model to generate the simulated image predicted action outputs;
   processing the predicted real image, using the action machine learning model, to generate one or more predicted real image predicted action outputs, wherein processing the predicted real image comprises:
      generating a predicted real image embedding by processing the predicted real image using the vision feature layers; and
      processing the predicted real image embedding using the additional layers to generate the real image predicted action outputs;
   in response to the pairing of the simulated image with the predicted real image:
      generating an embedding consistency loss as a function of comparison of the simulated image embedding and the predicted real image embedding; and
      updating the vision feature layers based on the generated embedding consistency loss.

2. The method of claim 1, wherein updating the vision feature layers based on the generated embedding consistency loss comprises:
   backpropagating the loss across the vision feature layers without backpropagating the loss across the additional layers.

3. The method of claim 1, further comprising, in response to the pairing of the simulated image with the predicted real image:
   generating one or more action consistency losses as a function of one or more action output comparisons, each of the action output comparisons being between a corresponding one of the simulated image predicted action outputs and a corresponding one of the predicted real image predicted action outputs; and updating the vision feature layers further based on the one or more action consistency losses.

4. The method of claim 3,
wherein the additional layers comprise a first control head and a second control head,
wherein the simulated image predicted action outputs comprise a first simulated image predicted action output generated using the first control head and a second simulated image predicted action output generated using the second control head, and
wherein the predicted real image predicted action outputs comprise a first predicted real image predicted action output generated using the first control head and a second predicted real image predicted action output generated using the second control head.

5. The method of claim 4, wherein generating the action consistency losses comprises:
generating a first action consistency loss based on comparison of the first simulated image predicted action output and the first predicted real image predicted action output;
generating a second action consistency loss based on comparison of the second simulated image predicted action output and the second predicted real image predicted action output; and
generating the action consistency loss as a function of the first action consistency loss and the second action consistency loss.

6. The method of claim 5, further comprising, in response to the pairing of the simulated image with the predicted real image:
backpropagating the first action consistency loss across the first control head; and
backpropagating the second action consistency loss across the second control head;
wherein updating the vision feature layers further based on the one or more action consistency losses comprises:
backpropagating residuals, of the first action consistency loss and the second action consistency loss, across the vision feature layers.

7. The method of claim 5,
wherein the first simulated image predicted action output and the first predicted real image predicted action output each define a corresponding first set of values for controlling a first robotic component; and
wherein the second simulated image predicted action output and the second predicted real image predicted action output each define a corresponding second set of values for controlling a second robotic component.

8. The method of claim 7,
wherein the first robotic component is one of a robot arm, a robot end effector, a robot base, or a robot head; and
wherein the second robotic component is another one of the robot arm, the robot end effector, the robot base, or the robot head.

9. The method of claim 1, further comprising:
distorting the simulated image, using one or more distortion techniques, to generate a distorted simulated image;
pairing the distorted simulated image with the predicted real image;
processing the distorted simulated image, using the action machine learning model, to generate one or more distorted simulated image predicted action outputs, wherein processing the distorted simulated image comprises:
generating a distorted simulated image embedding by processing the distorted simulated image using the vision feature layers; and
processing the distorted simulated image embedding using the additional layers to generate the distorted simulated image predicted action outputs;
in response to the pairing of the distorted simulated image with the predicted real image:
generating an additional embedding consistency loss as a function of comparison of the distorted simulated image embedding and the predicted real embedding; and
updating the vision feature layers based on the generated additional embedding consistency loss.

10. The method of claim 1, further comprising:
distorting the simulated image, using one or more distortion techniques, to generate a distorted simulated image;
pairing the distorted simulated image with the simulated image;
processing the distorted simulated image, using the action machine learning model, to generate one or more distorted simulated image predicted action outputs, wherein processing the distorted simulated image comprises:
generating a distorted simulated image embedding by processing the distorted simulated image using the vision feature layers; and
processing the distorted simulated image embedding using the additional layers to generate the distorted simulated image predicted action outputs;
in response to the pairing of the distorted simulated image with the simulated image:
generating an additional embedding consistency loss as a function of comparison of the distorted simulated image embedding and the simulated image embedding; and
updating the vision feature layers based on the generated additional embedding consistency loss.

11. The method of claim 1, wherein generating the predicted real image comprises:
processing the simulated image using the simulation-to-real generator model to generate, as direct output from the simulation-to-real generator model, an original predicted real image; and
distorting the original predicted real image, using one or more distortion techniques, to generate the predicted real image.

12. The method of claim 11, wherein the one or more distortion techniques comprise one or more of:
applying a crop,
adjusting brightness,
adjusting saturation,
adjusting hue,
adjusting contrast,
applying a cutout, or
adding Gaussian noise.

13. The method of claim 1, further comprising:
generating a predicted simulated image based on processing a real image using a real-to-simulation generator model,
wherein the real image is generated by one or more image components of a real robot during performance of the robotic task by the real robot;

in response to the predicted simulated image being generated based on processing the real image using the real-to-simulation generator model:
  pairing the real image with the predicted simulated image;
  processing the real image, using the action machine learning model, to generate one or more real image predicted action outputs, wherein processing the real image comprises:
    generating a real image embedding by processing the real image using the vision feature layers; and
    processing the real image embedding using the additional layers to generate the real image predicted action outputs;
  processing the predicted simulated image, using the action machine learning model, to generate one or more predicted simulated image predicted action outputs, wherein processing the predicted simulated image comprises:
    generating a predicted simulated image embedding by processing the predicted simulated image using the vision feature layers; and
    processing the predicted simulated image embedding using the additional layers to generate the predicted simulated image predicted action outputs;
  in response to the pairing of the real image with the predicted simulated image:
    generating an additional embedding consistency loss as a function of comparison of the real image embedding and the predicted simulated image embedding; and
    updating the vision feature layers based on the generated additional embedding consistency loss.

14. The method of claim 1, further comprising:
generating a first action supervision loss based on comparing the simulated image predicted action outputs to supervised action outputs;
generating a second action supervision loss based on comparing the predicted real image predicted action outputs to the supervised action outputs; and
updating the machine learning model further based on the first action supervision loss and the second action supervision loss.

15. The method of claim 1, further comprising:
generating a first action loss based on a reward function and controlling of a simulated robot using the simulated image predicted action outputs;
generating a second action loss based on the reward function and controlling of the simulated robot using the predicted real image predicted action outputs; and
updating the machine learning model further based on the first action loss and the second action loss.

16. The method of claim 1, further comprising:
subsequent to updating the vision layers based on the generated embedding consistency loss, and subsequent to determining that further training of the machine learning model satisfies one or more training criteria:
  using the machine learning model in controlling a real robot to perform the robotic task.

17. The method of claim 16, wherein using the machine learning model in controlling the real robot to perform the robotic task comprises:
processing a real image, captured by one or more vision components of the real robot, using the action machine learning model, to generate one or more real image predicted action outputs, wherein processing the real image comprises:
  generating a real image embedding by processing the real image using the vision feature layers; and
  processing the real image embedding using the additional layers to generate the real image predicted action outputs; and
controlling one or more components of the real robot using the real image predicted action outputs.

18. The method of claim 1, wherein the simulated image comprises multiple color channels.

19. The method of claim 18, wherein the simulated image further comprises at least one additional channel, the at least one additional channel being a depth channel and/or a segmentation mask channel.

20. A method implemented by one or more processors, the method comprising:
generating a predicted simulated image based on processing a real image using a real-to-simulation generator model,
  wherein the real image is generated by one or more vision components of a robot during performance of a robotic task by the robot;
in response to the predicted simulated image being generated by processing the real image using the real-to-simulation generator model:
  pairing the real image with the predicted simulated image;
processing the real image, using an action machine learning model being trained for use in controlling a robot to perform the robotic task, to generate one or more real image predicted action outputs, wherein processing the real image comprises:
  generating a real image embedding by processing the real image using vision feature layers of the action machine learning model; and
  processing the real image embedding using additional layers of the action machine learning model to generate the real image predicted action outputs;
processing the predicted simulated image, using the action machine learning model, to generate one or more predicted simulated image predicted action outputs, wherein processing the predicted simulated image comprises:
  generating a simulated real image embedding by processing the predicted simulated image using the vision feature layers; and
  processing the predicted simulated embedding using the additional layers to generate the predicted simulated image predicted action outputs;
in response to the pairing of the real image with the predicted simulated image:
  generating an embedding consistency loss as a function of comparison of the real image embedding and the predicted simulated image embedding; and
  updating the vision feature layers based on the generated embedding consistency loss.

* * * * *